(12) United States Patent
Liu et al.

(10) Patent No.: US 11,968,368 B2
(45) Date of Patent: Apr. 23, 2024

(54) CROSS-COMPONENT PREDICTION WITH MULTIPLE-PARAMETER MODEL

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yuwen He, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 118 days.

(21) Appl. No.: 17/848,535

(22) Filed: Jun. 24, 2022

(65) Prior Publication Data

US 2022/0329816 A1 Oct. 13, 2022

Related U.S. Application Data

(63) Continuation of application No. PCT/CN2020/142127, filed on Dec. 31, 2020.

(30) Foreign Application Priority Data

Dec. 31, 2019 (WO) ................ PCT/CN2019/130430

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11)

(58) Field of Classification Search
CPC .. H04N 19/105; H04N 19/132; H04N 19/167; H04N 19/176; H04N 19/186
See application file for complete search history.

(56) References Cited

U.S. PATENT DOCUMENTS

| 2017/0244975 A1 | 8/2017 | Wang et al. |
| 2018/0262765 A1 | 9/2018 | Bordes et al. |

(Continued)

FOREIGN PATENT DOCUMENTS

| CN | 104871537 A | 8/2015 |
| CN | 109076241 A | 12/2018 |

(Continued)

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.http://phenix.it-sudparis.eu/jvet/doc_end_user/documents/16_Geneva/wg11/JVET-P2001-v14.zip.

(Continued)

*Primary Examiner* — Reza Aghevli
(74) *Attorney, Agent, or Firm* — Perkins Coie LLP

(57) ABSTRACT

A method of video processing includes performing a conversion between a current video block of a second color component of a video and a bitstream of the video using a cross-component prediction with multiple-parameter model (CCPMPM) in which samples of the current video block are predictively coded in the bitstream using a linear combination of samples of a first color component multiplied by linear coefficients and/or one or more offsets. The bitstream (Continued)

conforms to a format rule. The linear coefficients of the CCPMPM are determined using a first rule. The samples of the first color component are determined using a second rule.

20 Claims, 27 Drawing Sheets

(51) Int. Cl.
*H04N 19/176* (2014.01)
*H04N 19/186* (2014.01)

(56) References Cited

U.S. PATENT DOCUMENTS

| | | | |
|---|---|---|---|
| 2020/0252619 A1 | 8/2020 | Zhang et al. | |
| 2020/0366910 A1 | 11/2020 | Zhang et al. | |
| 2020/0366933 A1 | 11/2020 | Zhang et al. | |
| 2020/0382769 A1 | 12/2020 | Zhang et al. | |
| 2021/0092395 A1* | 3/2021 | Zhang | H04N 19/80 |
| 2021/0092396 A1 | 3/2021 | Zhang et al. | |
| 2021/0152837 A1 | 5/2021 | Zhang et al. | |
| 2021/0211681 A1 | 7/2021 | Zhang et al. | |
| 2021/0235109 A1 | 7/2021 | Liu et al. | |
| 2021/0258571 A1 | 8/2021 | Zhang et al. | |
| 2021/0258572 A1 | 8/2021 | Zhang et al. | |
| 2021/0297694 A1 | 9/2021 | Zhang et al. | |
| 2021/0314595 A1 | 10/2021 | Zhang et al. | |
| 2021/0321131 A1 | 10/2021 | Zhang et al. | |
| 2021/0344902 A1 | 11/2021 | Zhang et al. | |
| 2022/0124340 A1* | 4/2022 | Deng | H04N 19/176 |

FOREIGN PATENT DOCUMENTS

| | | | | |
|---|---|---|---|---|
| CN | 109196867 A | | 1/2019 | |
| CN | 109417623 A | | 3/2019 | |
| CN | 109691102 A | | 4/2019 | |
| CN | 109716773 A | | 5/2019 | |
| CN | 110100436 A | | 8/2019 | |
| CN | 113784128 A | * | 12/2021 | H04N 19/117 |
| EP | 3361726 A1 | | 11/2016 | |
| EP | 3780599 A4 | * | 12/2021 | H04N 19/105 |
| GB | 2567249 A | * | 4/2019 | H04N 19/105 |
| GB | 2571312 A | * | 8/2019 | H04N 19/103 |
| WO | 2014166965 A1 | | 10/2014 | |
| WO | 2016066028 A1 | | 5/2016 | |
| WO | WO-2016066028 A1 | * | 5/2016 | H04N 19/176 |
| WO | WO-2018045207 A1 | * | 3/2018 | H04N 19/117 |
| WO | 2018174617 A1 | | 9/2018 | |
| WO | 2019072595 A1 | | 4/2019 | |
| WO | 2019162116 A1 | | 8/2019 | |
| WO | WO-2021004445 A1 | * | 1/2021 | H04N 19/105 |
| WO | WO-2021136504 A1 | * | 7/2021 | H04N 19/105 |

OTHER PUBLICATIONS

De-Luxan-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

Hu et al. "Unification of Parameter Derivation for CCLM and LIC," Joint Video Exploration Team (JVET) of ITU-T SG 16 WP 3 and ISO/IEC JTC 1/SC 29/WG 11 4th Meeting: Chengdu, CN, Oct. 15-21, 2016, document JVET-D0122, 2016.

Kuo et al. "Non-CE3: MRL Intra Prediction for Chroma DM," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0672, 2019.

Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.

Tsai et al. "CE2-Related: Luma-Chroma Latency Reduction for Chroma Separate Tree," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0273, 2019.

https://vcgit.hhi.fraunhofer.de/jvet/VVCSoftware_VTM/-/tags/VTM-7.0.

International Search Report and Written Opinion from International Patent Application No. PCT/CN2020/142091 dated Mar. 30, 2021 (11 pages).

International Search Report and Written Opinion from International Patent Application No. PCT/CN2020/142127 dated Mar. 29, 2021 (11 pages).

International Search Report and Written Opinion from International Patent Application No. PCT/CN2020/142161 dated Jun. 17, 2021 (9 pages).

* cited by examiner

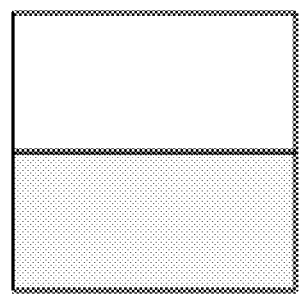
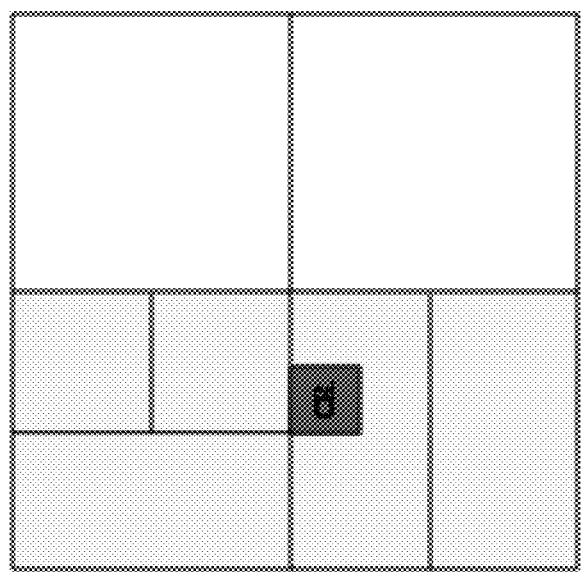
FIG. 10B
FIG. 10A

2310

2312 performing a conversion between a current video block of a video and a bitstream of the video using an intra prediction coding tool in which one or more reference lines are selectively used for prediction according to a rule

performing a conversion between a current video block of a second color component of a video and a bitstream of the video using a cross-component prediction with multiple-parameter model (CCPMPM) in which samples of the current video block are predictively coded in the bitstream using a linear combination of samples of a first color component multiplied by linear coefficients and/or one or more offsets — 2332

FIG. 23C

CROSS-COMPONENT PREDICTION WITH MULTIPLE-PARAMETER MODEL

CROSS-REFERENCE TO RELATED APPLICATIONS

This application is a continuation of International Patent Application No. PCT/CN2020/142127, filed on Dec. 31, 2020, which claims the priority to and benefits of International Patent Application No. PCT/CN2019/130430, filed on Dec. 31, 2019. All the aforementioned patent applications are hereby incorporated by reference in their entireties.

TECHNICAL FIELD

This patent document relates to video coding and decoding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, a method of video processing is disclosed. The method includes performing a conversion between a current video block of a video and a bitstream of the video using an intra prediction coding tool in which one or more reference lines are selectively used for prediction according to a rule, wherein the bitstream conforms to a format rule; wherein the current video block is of a color component that is different from a luma color component of the video.

In another representative aspect, a method of video processing is disclosed. The method includes determining, for a conversion between a current video block of a color component of a video and a bitstream of the video, that the current video block inherits intra coding characteristics from a corresponding intra-coded luma video block; and performing the conversion based on the determining.

In another representative aspect, a method of video processing is disclosed. The method includes performing a conversion between a current video block of a second color component of a video and a bitstream of the video using a cross-component prediction with multiple-parameter model (CCPMPM) in which samples of the current video block are predictively coded in the bitstream using a linear combination of samples of a first color component multiplied by linear coefficients and/or one or more offsets; wherein the bitstream conforms to a format rule; and wherein the linear coefficients of the CCPMPM are determined using a first rule; and wherein the samples of the first color component are determined using a second rule.

In another representative aspect, a method of video processing is disclosed. The method includes determining to use, for a conversion between a current video block of a first component of a video and a bitstream of the video, a prediction of the current video block from a linear combination of samples of a second video block of a second component of the video according to a rule; and performing the conversion based on the determining; wherein the current video block and the second video block are coded using a local illumination compensation tool.

In another representative aspect, a method of video processing is disclosed. The method includes performing a conversion between a current video block of a video and a bitstream of the video, wherein samples of the current video block are predictively coded using a multiple-parameter model (IPMPM) in which a linear combination of reference samples of the video using linear coefficients and/or an offset value; and wherein the bitstream conforms to a format rule.

Further, in a representative aspect, an apparatus in a video system comprising a processor and a non-transitory memory with instructions thereon is disclosed. The instructions upon execution by the processor, cause the processor to implement any one or more of the disclosed methods.

In another aspect, a bitstream stored on a computer-readable storage medium is disclosed, wherein the bitstream is generated according to an encoding method described in the present document.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIGS. 10A and 10B show examples of luma CTB partitioning and chroma CTB partitioning respectively.

FIGS. 23A-23E depict flowcharts for various methods of video processing.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 7) could be found at: http://phenix.it-sudparis.eu/jvet/doc_end_user/documents/16_Geneva/wg11/JVET-P2001-vE.zip. The latest reference software of VVC, named VTM, could be found at: https://vcgit.hhi.fraunhofer.de/jvet/VVCSoftware_VTM/-/tags/VTM-7.0.

2.1. Coding Flow of a Typical Video Codec

Figure 1:
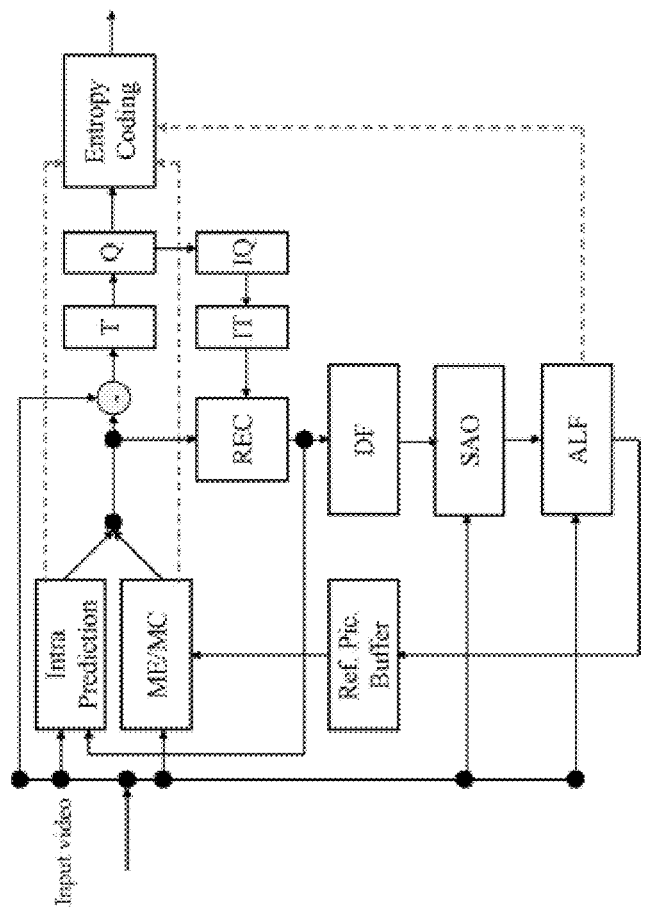
FIG. 1 shows an example of an encoder block diagram.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2. Intra Coding in VVC

2.2.1. Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
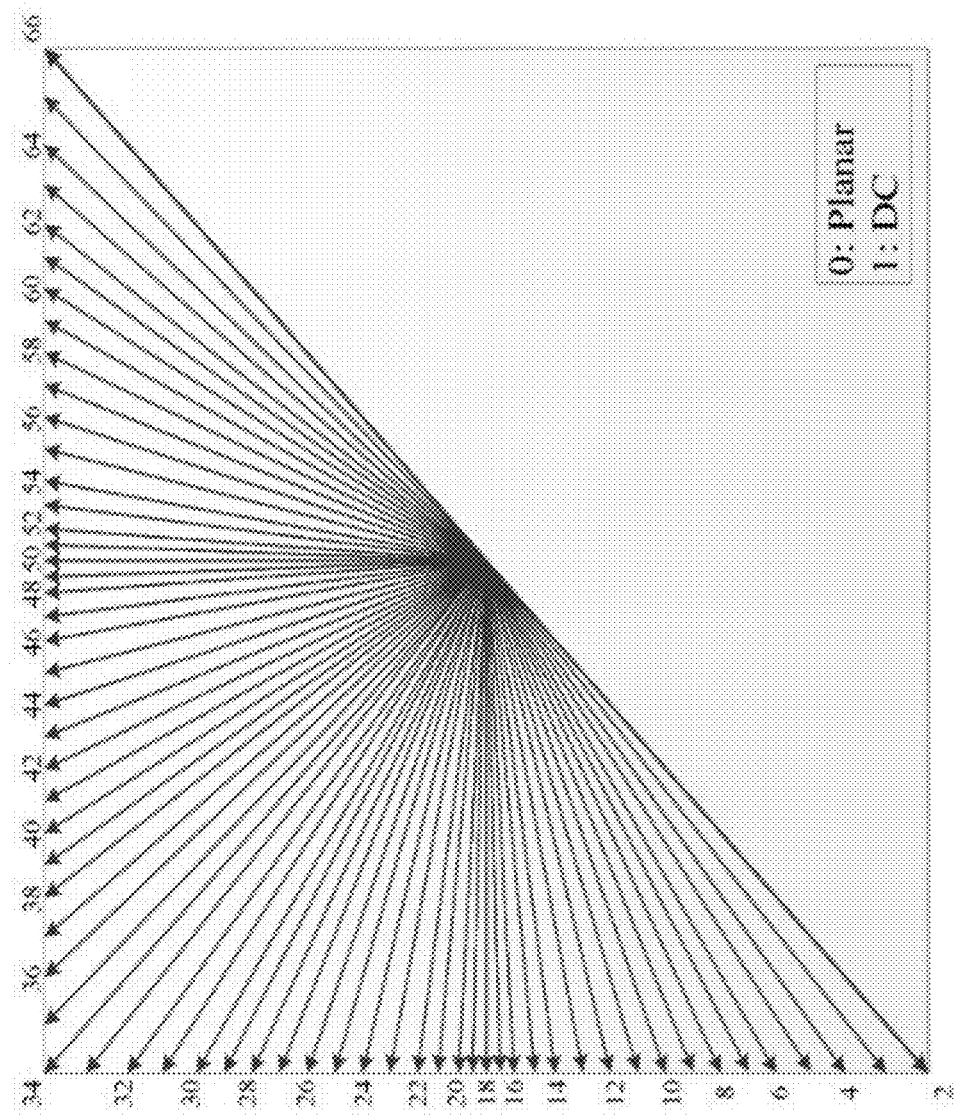
FIG. 2 shows an example of 67 intra prediction modes
Figure 3:
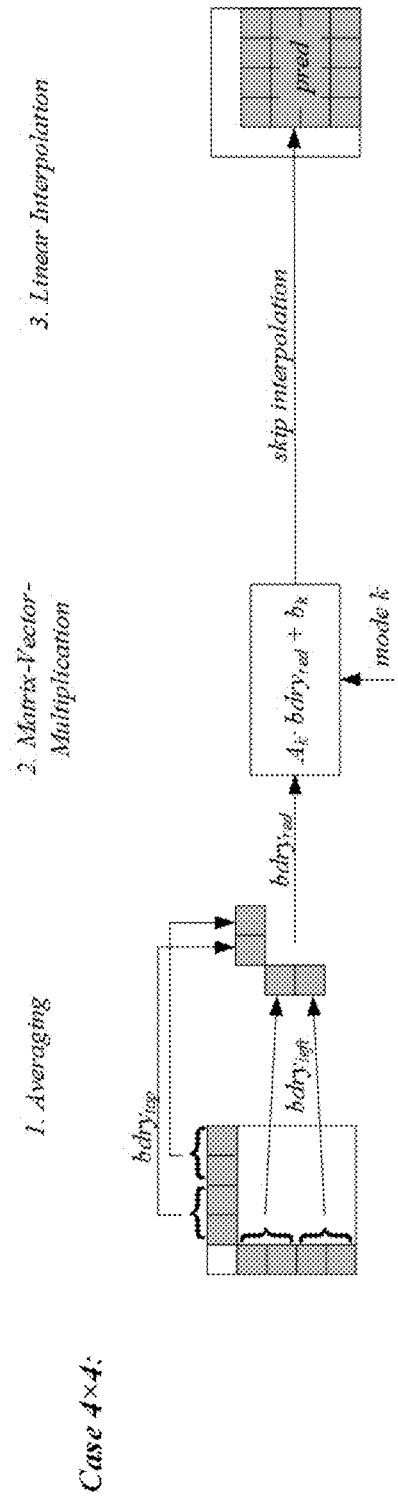
FIG. 3 shows an illustration of ALWIP for 4×4 blocks.
Figure 4:
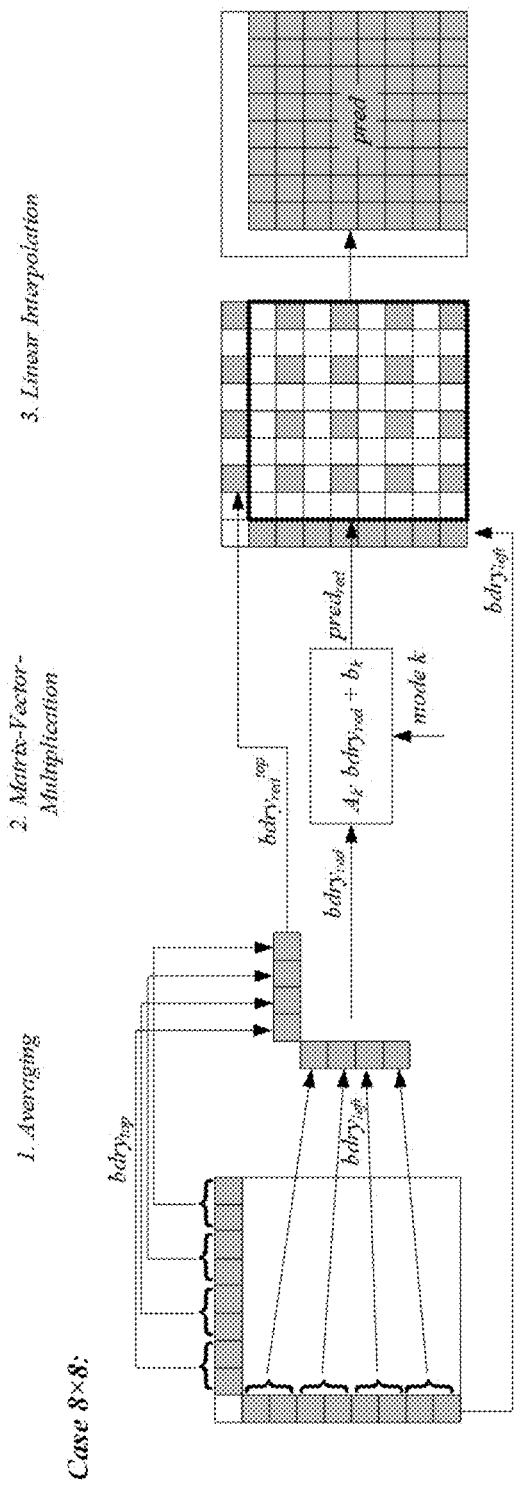
FIG. 4 shows an illustration of ALWIP for 8×8 blocks.
Figure 5:
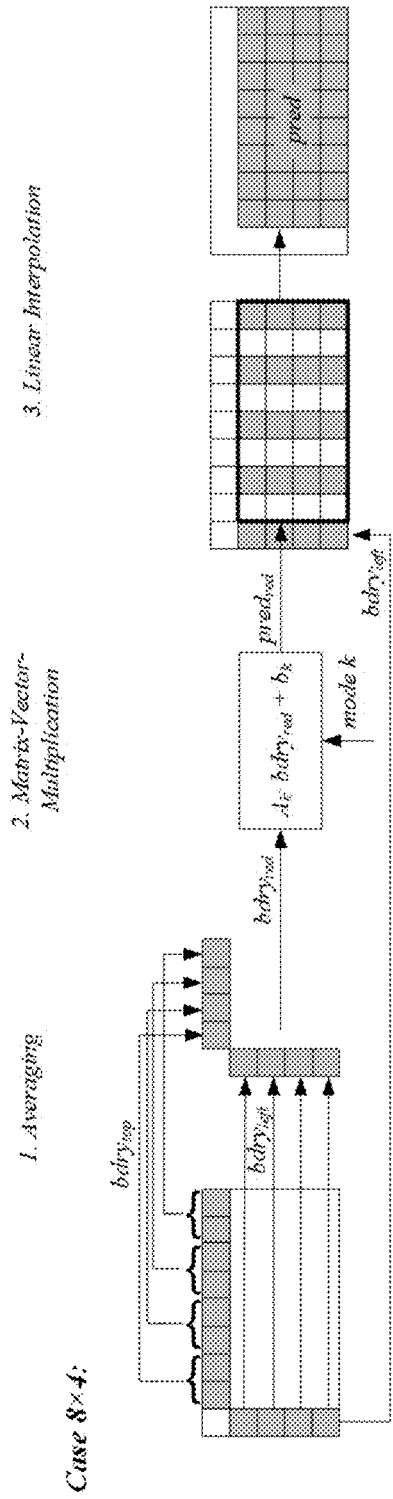
FIG. 5 shows an illustration of ALWIP for 8×4 blocks.
Figure 6:
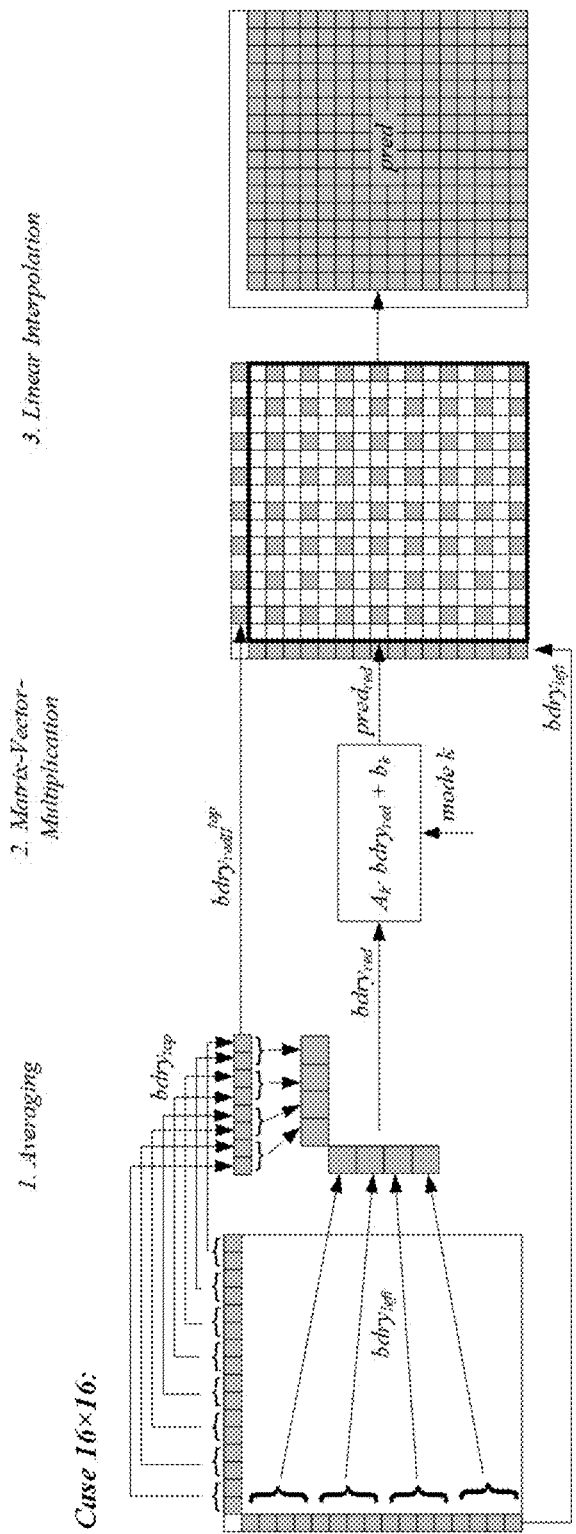
FIG. 6 shows an illustration of ALWIP for 16×16 blocks.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signalling: planar, DC, horizontal (Mode 18), vertical (Mode 50), bottom-left angular mode and its eight adjacent angular modes, and top-right angular mode and its eight adjacent angular modes.

2.2.2. Affine Linear Weighted Intra Prediction (ALWIP)

Affine linear weighted intra prediction (ALWIP, a.k.a. Matrix based intra prediction (MIP)) is proposed in JVET-N0217.

2.2.2.1. Generation of the Reduced Prediction Signal by Matrix Vector Multiplication The neighboring reference samples are firstly down-sampled via averaging to generate the reduced reference signal bdry$_{red}$. Then, the reduced prediction signal pred$_{red}$ is computed by calculating a matrix vector product and adding an offset:

$$\text{pred}_{red} = A \cdot \text{bdry}_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.2.2.2. Illustration of the Entire ALWIP Process

The entire process of averaging, matrix vector multiplication and linear interpolation is illustrated for different shapes in FIGS. 3-6. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary. The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally, for W×4 blocks with W>8, let $A_k$ be the matrix that arises by leaving out every row that corresponds to an odd entry along the horizontal axis of the downsampled block. Thus, the output size is 32 and again, only horizontal interpolation remains to be performed.

The transposed cases are treated accordingly.

2.2.3. Multiple Reference Line (MRL)

Figure 7:
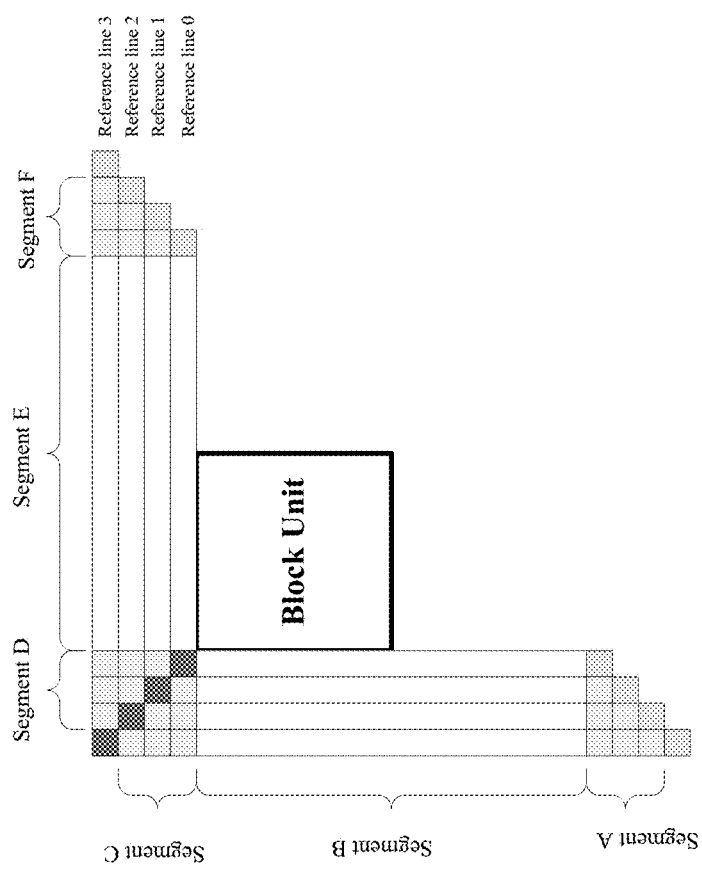
FIG. 7 shows an example of four reference lines neighboring to a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in MPM list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a CTU to prevent using extended reference samples outside the current CTU line. Also, PDPC is disabled when additional line is used.

2.2.4. Intra Subblock Partitioning (ISP)

Figure 8:
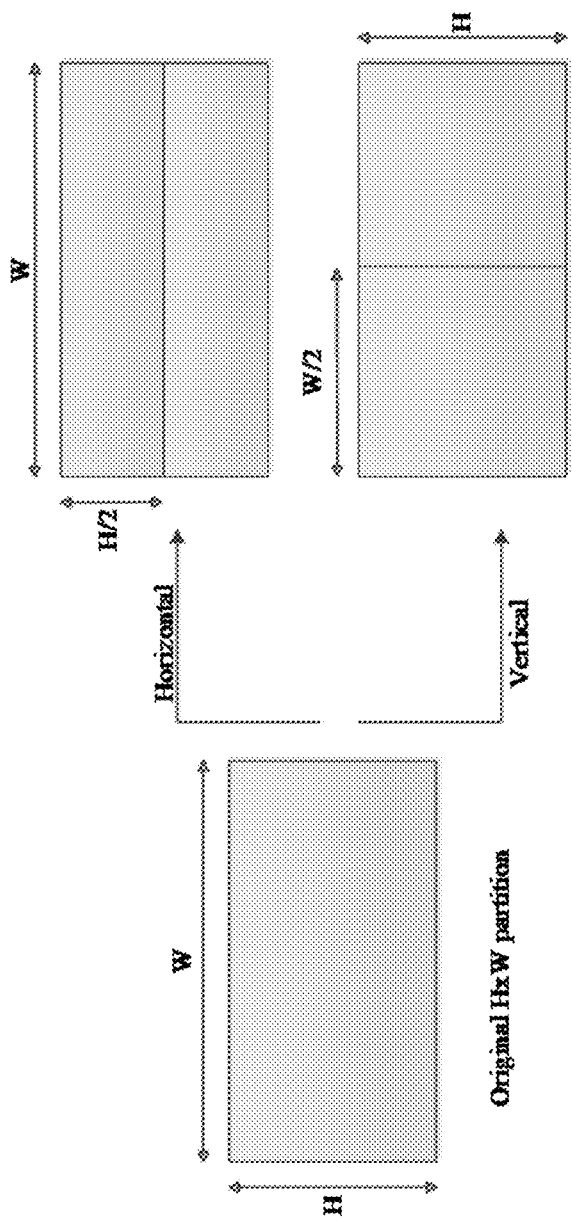
FIG. 8 shows an example of division of 4×8 and 8×4 blocks.
Figure 9:
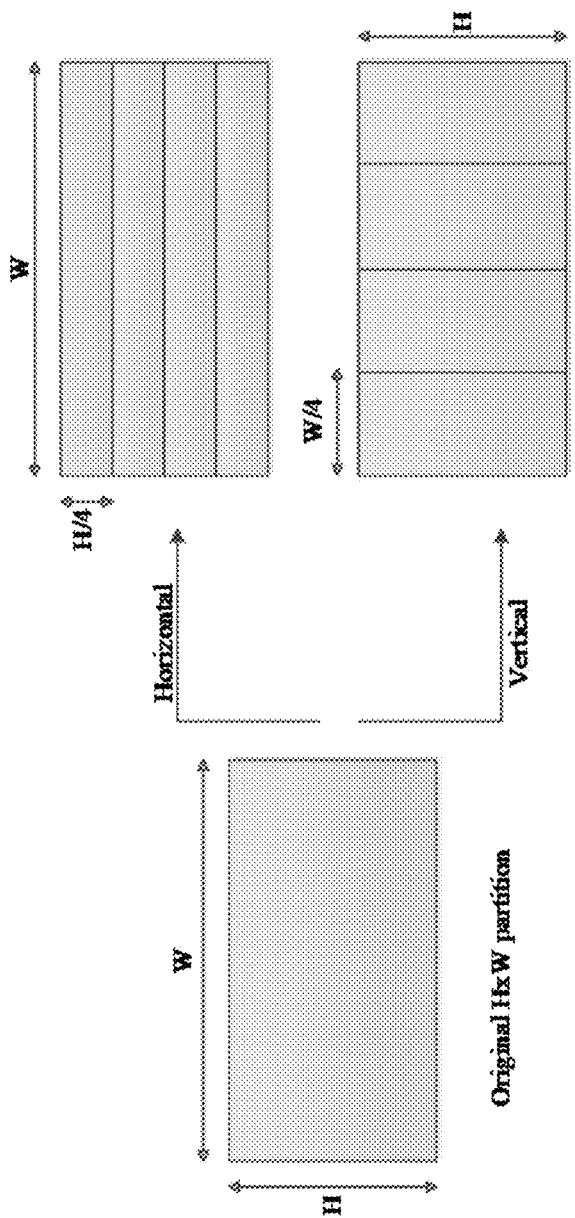
FIG. 9 shows an example of division of all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 1. FIGS. 8 and 9 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size (denoted maximum transform size by maxTBSize)

| Splitting direction | Block Size | Number of Sub-Partitions |
| --- | --- | --- |
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 2

Specification of trTypeHor and trTypeVer depending on predModeIntra

| predModeIntra | trTypeHor | trTypeVer |
| --- | --- | --- |
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? DST-VII : DCT-II | ( nTbW >= 4 && nTbW <= 16 ) ? DST-VII : DCT-II |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? DST-VII : DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , | DCT-II | ( nTbH >= 4 && nTbH <= 16 ) ? DST-VII : DCT-II |

TABLE 2-continued

Specification of trTypeHor and trTypeVer depending on predModeIntra

| predModeIntra | trTypeHor | trTypeVer |
|---|---|---|
| INTRA_ANGULAR64, INTRA_ANGULAR66 | | |

2.2.5. Chroma Coding

When cross-component linear model mode is enabled for a sequence, total of 8 intra modes are allowed for chroma intra mode coding. Those modes include five traditional intra modes and three cross-component linear model modes (CCLM_AL, CCLM_A, and CCLM_L) for chroma intra mode coding. Otherwise, the conventional 5 chroma intra modes are enabled for chroma intra mode coding.

Four default modes (DC, Planar, Hor, Ver) are used in addition to the DM (direct or derived mode from luma block) mode. If the DM mode is equal to one of the four default mode, the redundant DM mode is replaced by the intra prediction mode with largest mode index (i.e., Mode 66).

2.2.5.1. DM Mode

Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited. An example is depicted in FIGS. 10A and 10B. The position for DM derivation for the left chroma CB (in FIG. 10B) from the corresponding luma block (denoted by CR in FIG. 10A).

2.2.5.2. Cross-Component Linear Model Prediction

A cross-component linear model (CCLM) prediction mode is used in the VVC, for which the chroma samples are predicted based on the reconstructed luma samples of the same CU by using a linear model as follows:

$$pred_C(i,j) = \alpha \cdot rec_L'(i,j) + \beta \quad (2\text{-}1)$$

where $pred_C(i,j)$ represents the predicted chroma samples in a CU and $rec_L(i,j)$ represents the downsampled reconstructed luma samples of the same CU.

The CCLM parameters ($\alpha$ and $\beta$) are derived with at most four neighbouring chroma samples and their corresponding down-sampled luma samples. Suppose the current chroma block dimensions are W×H, then W' and H' are set as
- W'=W, H'=H when LM mode is applied;
- W'=W+H when LM-A mode is applied;
- H'=H+W when LM-L mode is applied;

The above neighbouring positions are denoted as $S[0, -1] \ldots S[W'-1, -1]$ and the left neighbouring positions are denoted as $S[-1, 0] \ldots S[-1, H'-1]$. Then the four samples are selected as
- $S[W'/4, -1], S[3W'/4, -1], S[-1, H'/4], S[-1, 3H'/4]$ when LM mode is applied and both above and left neighbouring samples are available;
- $S[W'/8, -1], S[3W'/8, -1], S[5W'/8, -1], S[7W'/8, -1]$ when LM-A mode is applied or only the above neighbouring samples are available;
- $S[-1, H'/8], S[-1, 3H'/8], S[-1, 5H'/8], S[-1, 7H'/8]$ when LM-L mode is applied or only the left neighbouring samples are available;

The four neighbouring luma samples at the selected positions are down-sampled and compared four times to find two smaller values: $x^0_A$ and $x^1_A$, and two larger values: $x^0_B$ and $x^1_B$. Their corresponding chroma sample values are denoted as $y^0_A, y^1_A, y^0_B$ and $y^1_B$. Then $x_A, x_B, y_A$ and $y_B$ are derived as:

$$X_a = (x^0_A + x^1_A + 1) \gg 1; \ X_b = (x^0_B + x^1_B + 1) \gg 1; \ Y_a = (y^0_A + y^1_A + 1) \gg 1; \ Y_b = (y^0_B + y^1_B + 1) \gg 1 \quad (2\text{-}2)$$

Finally, the linear model parameters $\alpha$ and $\beta$ are obtained according to the following equations.

$$\alpha = \frac{Y_a - Y_b}{X_a - X_b} \quad (2\text{-}3)$$

$$\beta = Y_b - \alpha \cdot X_b \quad (2\text{-}4)$$

Figure 11:
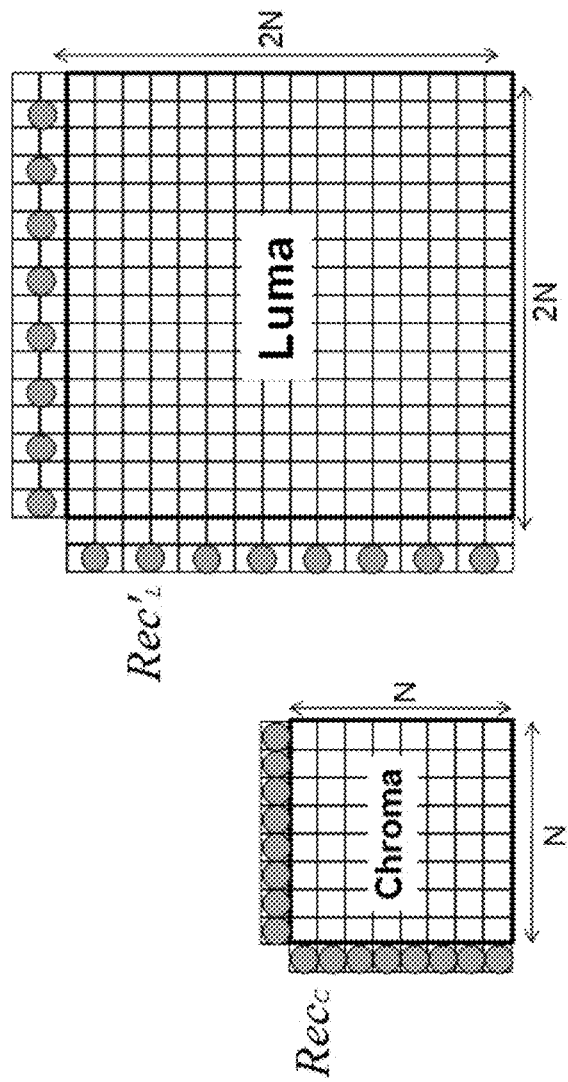
FIG. 11 shows an example of locations of the samples used for the derivation of $\alpha$ and $\beta$.
Figure 12:
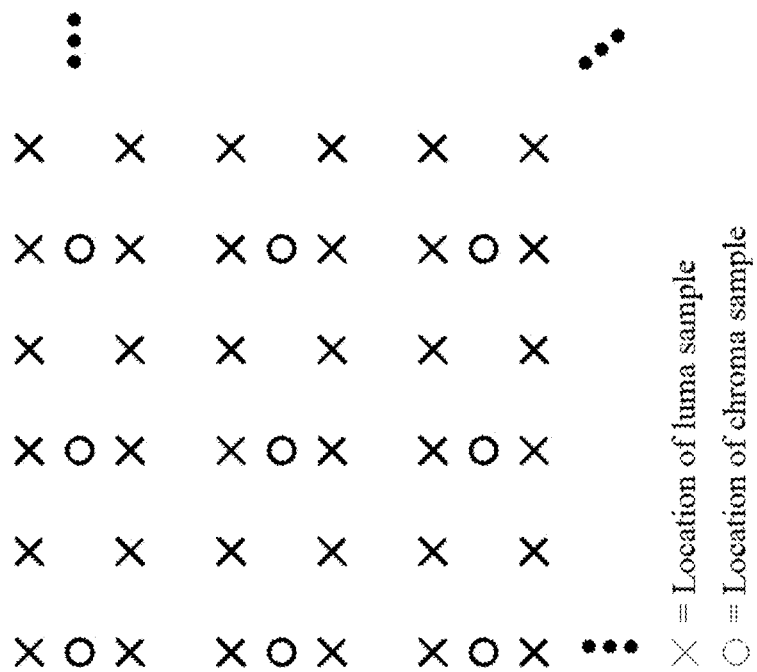
FIG. 12 shows an example of nominal vertical and horizontal locations of 4:2:0 luma and chroma samples in a picture.

FIG. 11 shows an example of the location of the left and above samples and the sample of the current block involved in the CCLM mode.

The division operation to calculate parameter $\alpha$ is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

$$\text{DivTable}[\ ] = \{0, 7, 6, 5, 5, 4, 4, 3, 3, 2, 2, 1, 1, 1, 1, 0\} \quad (2\text{-}5)$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H). In LM_L mode, only left template is used to calculate the linear model coefficients. To get more samples, the left template is extended to (H+W).

For a non-square block, the above template is extended to W+W, the left template is extended to H+H.

To match the chroma sample locations for 4:2:0 video sequences, two types of downsampling filter are applied to luma samples to achieve 2 to 1 downsampling ratio in both horizontal and vertical directions. The selection of downsampling filter is specified by a SPS level flag. The two downsampling filters are as follows, which are corresponding to "type-0" and "type-2" content, respectively.

$$rec_L'(i, j) = \begin{bmatrix} rec_L(2i-1, 2j-1) + 2 \cdot rec_L(2i-1, 2j-1) + \\ rec_L(2i+1, 2j-1) + rec_L(2i-1, 2j) + \\ 2 \cdot rec_L(2i, 2j) + rec_L(2i+1, 2j) + 4 \end{bmatrix} \gg 3 \quad (2\text{-}6)$$

$$rec'_L(i, j) = \begin{bmatrix} rec_L(2i, 2j-1) + rec_L(2i-1, 2j) + \\ 4 \cdot rec_L(2i, 2j) + rec_L(2i+1, 2j) + \\ rec_L(2i, 2j+1) + 4 \end{bmatrix} >> 3 \quad (2\text{-}7)$$

Note that only one luma line (general line buffer in intra prediction) is used to make the downsampled luma samples when the upper reference line is at the CTU boundary.

This parameter computation is performed as part of the decoding process, and not just as an encoder search operation. As a result, no syntax is used to convey the $\alpha$ and $\beta$ values to the decoder.

2.3. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma sub sampling is the practice of encoding images by implementing less resolution for chroma information than for luma information, taking advantage of the human visual system's lower acuity for color differences than for luminance.

2.3.1. 4:4:4

Each of the three Y'CbCr components have the same sample rate, thus there is no chroma sub sampling. This scheme is sometimes used in high-end film scanners and cinematic post production.

2.3.2. 4:2:2

The two chroma components are sampled at half the sample rate of luma: the horizontal chroma resolution is halved. This reduces the bandwidth of an uncompressed video signal by one-third with little to no visual difference.

2.3.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

Figure 13:
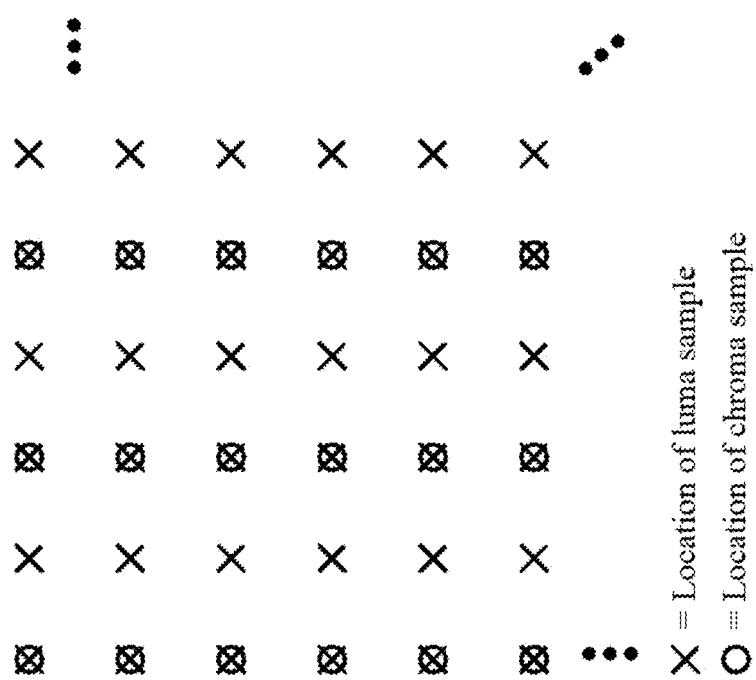
FIG. 13 shows an example of nominal vertical and horizontal locations of 4:2:2 luma and chroma samples in a picture.

When the value of chroma_format_idc is equal to 2, the chroma samples are co-sited with the corresponding luma samples and the nominal locations in a picture are as shown in FIG. 13.

Figure 14:
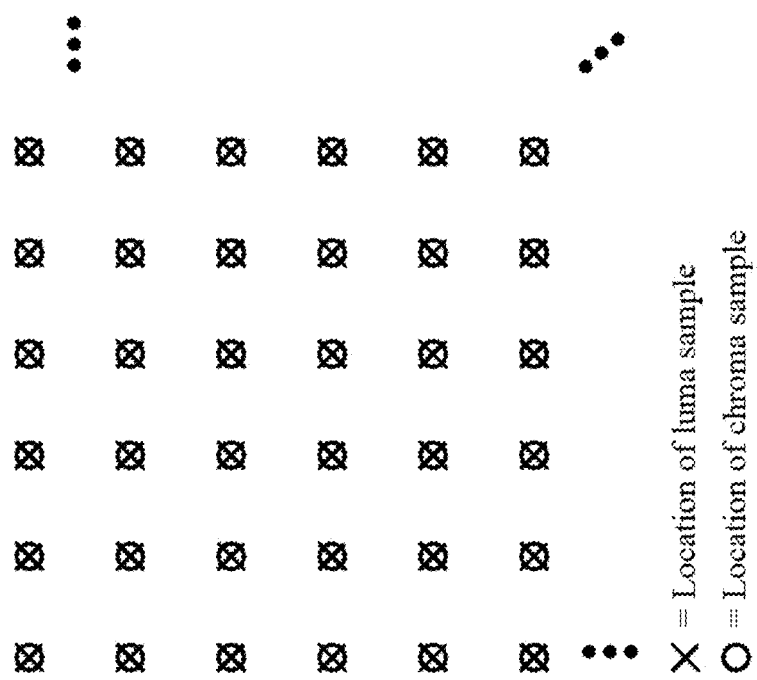
FIG. 14 shows an example of nominal vertical and horizontal locations of 4:4:4 luma and chroma samples in a picture.

When the value of chroma_format_idc is equal to 3, all array samples are co-sited for all cases of pictures and the nominal locations in a picture are as shown in FIG. 14.

TABLE 3

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

2.4. Cross-Component Prediction with Multiple-Parameter Model

Figure 15:
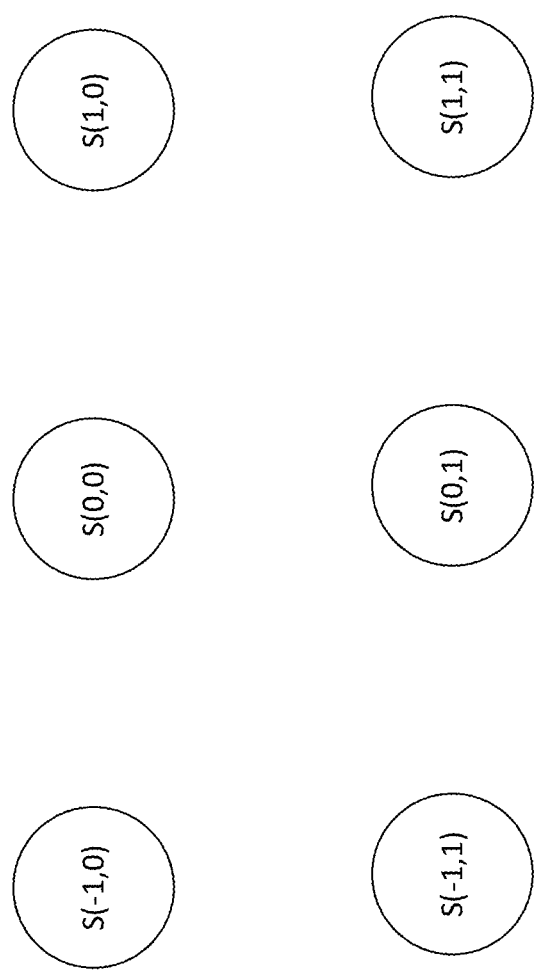
FIG. 15 shows samples of one color component for derivation of prediction values at (0, 0).

In Application No. PCT/CN2018/123394, entitled "Multi-step Inter-component Prediction," which is incorporated for reference herein, it is proposed to use a multiple-parameter model to derive inter-component prediction blocks. Assume that one C1 sample ($S^0_{c1}$) is associated with multiple C0 samples (denoted by $S^0_{c0}, S^1_{c0}, \ldots, S^{L-1}_{c0}$), each C0 sample may be assigned with one weighting parameter $\alpha^i$. In this case, the prediction value of $S^0_{c1}$ may be depend on $\alpha^i * S^i_{c0}$. The variable a shown below is the same as the variable a.

a. In one example, suppose the $S^0_{c1}$ is a sample located at (x, y), the L samples are defined as the samples located at (2*x−1, 2*y), (2*x−1, 2*y+1), (2*x, 2*y), (2*x, 2*y+1), (2*x+1, 2*y) and (2*x+1, 2*y+1).
   b. In one example, suppose the $S^0_{c1}$ is a sample located at (x, y), the L samples are defined as the samples located at (2*x, 2*y), (2*x, 2*y+1).
   c. How many C0 samples associated with one C0 sample and the relative positions of those C0 samples may depend on the coordinate (x, y) of the C1 sample.
   d. How many C0 samples associated with one C0 sample and the relative positions of those C0 samples may depend on the availability of C0 samples.
   e. In one example, the prediction value of $S^0_{c1}$ may be defined as $\Sigma_{k=0}^{L-1} \alpha^k * S_{c0}^k$.
   f. In one example, the prediction value of $S^0_{c1}$ may be defined as $(\Sigma_{k=0}^{L-1} \alpha^k * S_{c0}^k) \gg M$ wherein variable M is an integer.

i. Alternatively, the prediction value of $S^0_{c1}$ may be defined as $\text{Clip3}((\Sigma_{k=0}^{L-1}\alpha^k * S_{c0}^k) \gg M)$ where the operation Clip3 clips the prediction value with in a valid range.

g. In one example, the prediction value of $S^0_{c1}$ may be defined as $((\Sigma_{k=0}^{L-1}\alpha^k = * S_{c0}^k) \gg M) + b$ wherein variable b is an integer.

i. Alternatively, the prediction value of $S^0_{c1}$ may be defined as $\text{Clip3}(((\Sigma_{k=0}^{L-1}\alpha^k * S_{c0}^k) \gg M) + b)$, where the operation Clip3 clips the prediction value with in a valid range.

h. In one example, the prediction value of $S^0_{c1}$ may be defined as $\Sigma_{k=0}^{L-1}(\alpha^k * S_{c0}^k + b^k)$ wherein variable b is an integer.

i. Alternatively, the prediction value of $S^0_{c1}$ may be defined as $\text{Clip3}(\Sigma_{k=0}^{L-1}(\alpha^k * S_{c0}^k + b^k))$ where the operation Clip3 clips the prediction value with in a valid range.

i. In one example, the prediction value of $S^0_{c1}$ may be defined as $\Sigma_{k=0}^{L-1}(((\alpha^k * S_{c0}^k) \gg M^k) + b^k)$ wherein variable b is an integer.

i. Alternatively, the prediction value of $S^0_{c1}$ may be defined as $\text{Clip3}(\Sigma_{k=0}^{L-1}(((\alpha^k * S_{c0}^k) \gg M^k) + b^k))$, where the operation Clip3 clips the prediction value with in a valid range.

j. There may be some predefined relationship between parameters. For example, $\alpha^0$, $\alpha^1$, $\alpha^2$, $\alpha^3$, $\alpha^4$ and $\alpha^5$ are applied on samples S(0,0), S(0,1), S(−1,0), S(−1,1), S(1, 0), and S(1, 1) as shown in FIG. 15, then it is predefined that $\alpha^0 = \alpha^1 = 2 \times \alpha^2 = 2 \times \alpha^3 = 2 \times \alpha^4 = 2 \times \alpha^5$.

k. There may be more than one predefined relationship between parameters. One of the predefine relationship may be selected. The selection may be derived by the decoder, or it may be signaled from the encoder to the decoder in VPS/SPS/PPS/slice header/tile group/tile/CTU row/CTU/CU/PU.

3. Drawbacks of Existing Implementations

There are several problems in the current intra coding:
1. Multiple reference line intra prediction is disallowed in the following cases:
   a. Chroma intra prediction.
   b. Combined Intra-Inter Prediction (CIIP) mode.
   c. MIP.
2. In cross-component prediction, luma samples are downsampled with fixed filters for 4:2:0 and 4:2:2 format, which may be inefficient.
3. In Application No. PCT/CN2018/123394, entitled "Multi-step Inter-component Prediction," which is incorporated for reference herein, a cross-component prediction with multiple-parameter model is introduced. Such a design can be further improved.

4. Example Techniques and Embodiments

The items described below should be considered as examples to explain general concepts. These embodiments should not be interpreted in a narrow way. Furthermore, these embodiments can be combined in any manner.

In the following discussions, the conventional intra prediction method may represent the way that uses the adjacent line/column for intra prediction which may use interpolation filter along the prediction direction. And the additional intra coding methods may represent those which are newly introduced in VVC or may be introduced in the future and require additional signaling for the usage for this method. The additional method may be one or multiple of MIP, MRL, ISP, or QR-BDPCM/PCM etc. Reference line may refer to reference row and/or reference column.

Multiple Reference Line Chroma Prediction

1. It is proposed that non-adjacent reference lines (i.e., neither the closest above row nor the closest left column) may be used for intra prediction, for a color component other than the luma component, such as Cb, Cr, R, G, or B. In the following discussion, the color component may be referred as "chroma".

a. Alternatively, furthermore, a set of allowed reference lines (e.g., similar to MRL for luma component, the reference line 0/1/2 above current row or left column) may be used for intra prediction.

b. Alternatively, furthermore, multiple sets of allowed reference lines (e.g., for one of the multiple sets, it may include the reference line 0/1/2 above current row or left column) may be used for intra prediction.

c. In one example, indications of allowed non-adjacent reference lines in a set may be predefined.

d. In one example, indications of non-adjacent reference lines in a set may be signaled in the sequence/video/picture/slice/tile/subpicture/brick/other video unit (e.g., CTU row/CTU) level.

i. Alternatively, furthermore, the VPS (Video Parameter Set)/SPS (Sequence Picture Set)/APS (Adaptation Parameter Set)/PPS (Picture Parameter Set)/picture header/slice header/tile group header/CTU.

2. It is proposed that which chroma reference line to be used for chroma prediction may be signaled explicitly or derived implicitly.

a. In one example, a first syntax may be signaled to indicate whether non-adjacent chroma reference line is used or not.

i. Alternatively, furthermore, and a second syntax may be further signaled to indicate which non-adjacent chroma reference line is used.

ii. Alternatively, a third syntax may be signaled to indicate which chroma reference line is used for chroma prediction. The reference line may be an adjacent reference line or non-adjacent reference line.

iii. In one example, the first syntax may be a flag (e.g., binary value).

iv. In one example, the second/third syntax may be an index which could be a binary or non-binary value.

b. In one example, the reference line index to be used by a chroma block is determined by jointly utilizing the reference line index associated with a representative luma block and neighboring (adjacent or non-adjacent) chroma samples relative to the current chroma block.

3. It is proposed that chroma intra prediction may inherit that from luma intra prediction.

a. In one example, a mode (e.g. DM) may be used to represent that chroma intra prediction follow the same prediction direction and/or same prediction line.

b. In one example, whether to and/or how to inherit the luma intra-prediction may depend on the color formats.

4. In one example, whether and/or how to utilize non-adjacent chroma reference line may depend on the color format.

a. In one example, for 4:2:0 color format, non-adjacent chroma reference line may not be allowed.

b. In one example, for 4:4:4 color format, non-adjacent chroma reference line may be used.

5. The usage of a non-adjacent chroma reference line may depend on whether the line is left to the current block or above to the current block.

a. In one example, the number of non-adjacent lines to be used are different for samples left to the current block and above to the current block.

6. It is proposed that one or multiple non-adjacent reference lines may be used in MIP mode.

a. In one example, non-adjacent reference lines may be used for generating the reduced reference signal.

b. In one example, non-adjacent reference lines may be used for up sampling the reduced prediction signal.

c. In one example, adjacent and non-adjacent lines may both be used to generate MIP prediction signal.

d. Alternatively, furthermore, indication of reference lines to be used may be signaled in a bitstream.

7. It is proposed that MRL may be enabled for CIIP mode or other modes that require an intra prediction signal.

a. In one example, MRL may be applied to CIIP mode on chroma components.

b. In one example. MRL may be applied to Block-based Delta PCM (BDPCM) mode.

Cross-Component Prediction with Multiple Parameter Model (CCPMPM)

Multiple-parameter model like $y=\Sigma_{k=0}^{n}\alpha(k)\times x(k)+b$ may be used for cross-component prediction, wherein $x(k)$ $k=0 \ldots n$ is a group of $1^{st}$ color component samples, y is a $2^{nd}$ color component sample, a(k) are the linear coefficients, b is an offset and n is the total number of the $1^{st}$ color component samples used for predicting a $2^{nd}$ color component sample.

8. It is proposed that linear combination of a group of $1^{st}$ color component samples may be used for predicting a $2^{nd}$ color component sample and the linear coefficient (e.g., $\alpha(k)$ in the multiple-parameter model) may be derived or signaled individually for each of the $1^{st}$ color component sample. Indication of the prediction error (i.e., difference between the original value and the predicted value) may be further coded to a bitstream.

a. Alternatively, furthermore, an offset may be added to the linear combination of the $1^{st}$ color component samples for predicting the $2^{nd}$ color component sample.

9. Linear combination of a group of $1^{st}$ color component samples may be used for predicting a $2^{nd}$ color component sample and the linear coefficient may be derived or signaled individually for each set of the $1^{st}$ color component sample wherein the group of $1^{st}$ color component samples may be classified into multiple sets and one linear coefficient may be shared by each sample in the same set.

a. Alternatively, furthermore, an offset may be added to the linear combination of the $1^{st}$ color component samples for predicting the $2^{nd}$ color component sample.

Figure 16:
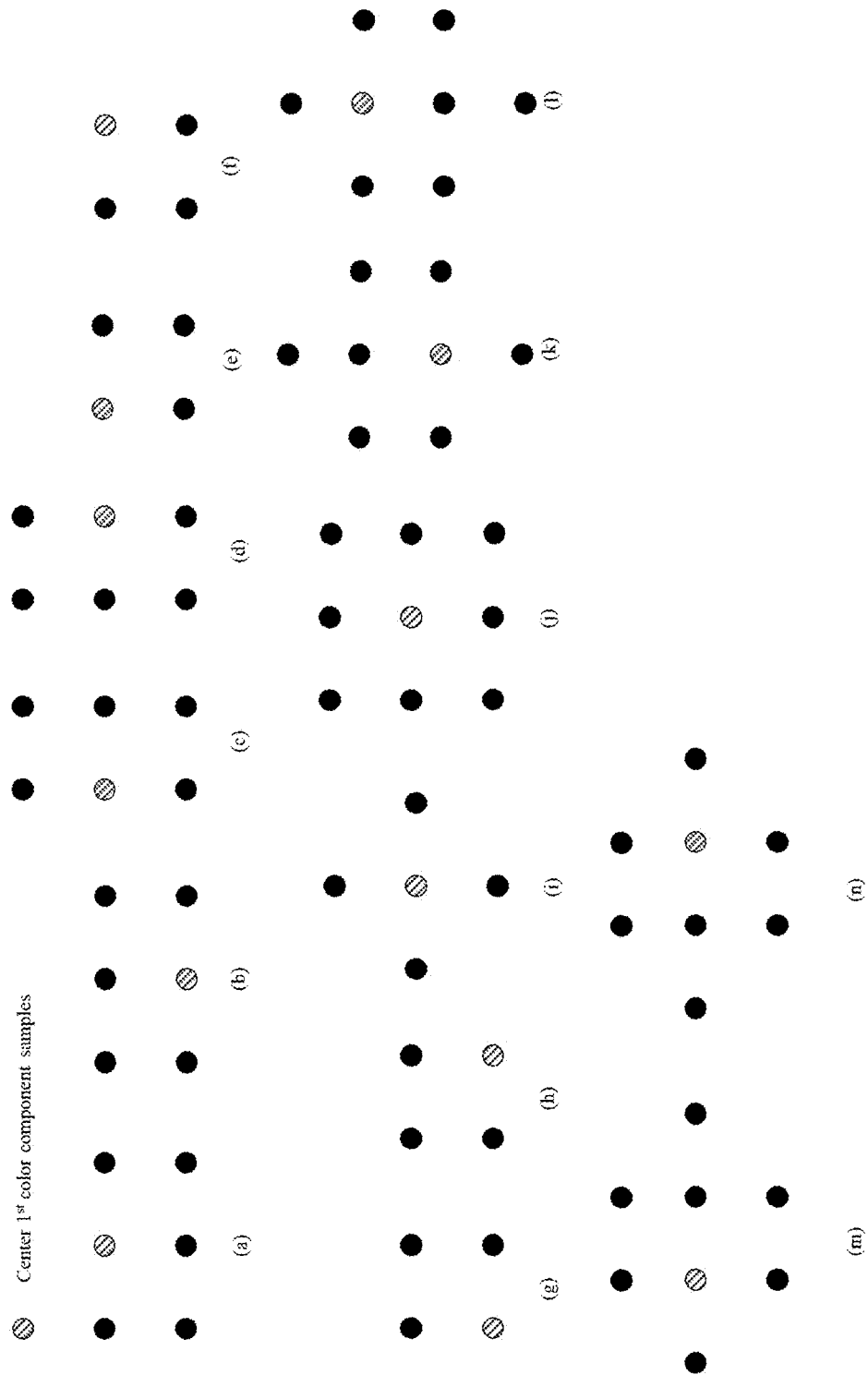
FIG. 16 shows examples of filter shape of $1^{st}$ color component samples used in cross-component prediction.

10. It is proposed that the group of $1^{st}$ color component samples used in cross-component intra prediction may be defined by a filter shape including a center $1^{st}$ color component sample.

a. In one example, the center $1^{st}$ color component sample may depend on the color format (e.g., 4:4:4, 4:2:2, 4:2:0) and position of the $2^{nd}$ color component sample.

i. For example, for a $2^{nd}$ color component sample located at (x, y), $1^{st}$ color component sample located at (x, y) may be used as the center $1^{st}$ color component sample for 4:4:4 format.

ii. For example, for a $2^{nd}$ color component sample located at (x, y), $1^{st}$ color component sample located at (2*x, y) may be used as the center sample for 4:2:2 format.

iii. For example, for a $2^{nd}$ color component sample located at (x, y), $1^{st}$ color component sample located at (2*x, 2*y) may be used as the center sample for 4:2:0 format.

b. In one example, the filter shape may be a N1-point rectangular or square, N2-point diamond, N4-point hexagon or N5-point octagon, wherein N1, N2, N3, N4 and N5 are positive integers. Some examples are shown in FIG. 16. The filter shape may be adaptively selected according to $1^{st}$ color component intra prediction mode.

11. The same shape of samples of the $1^{st}$ color component is used to derive the parameters and/or offsets for the linear combination, and to derive the prediction for the $2^{nd}$ color component with the derived parameters and/or offsets.

a. In one example, the least square method may be used for deriving the parameters and/or the offsets.

12. The samples used to derive the linear combination may be located in a specific region relative to the current block.

a. All the samples used to derive the linear combination may be located left to the current block.

b. All the samples used to derive the linear combination may be located above to the current block.

c. Using samples from different regions to derive the linear combination may be regarded as different modes.

Figure 17:
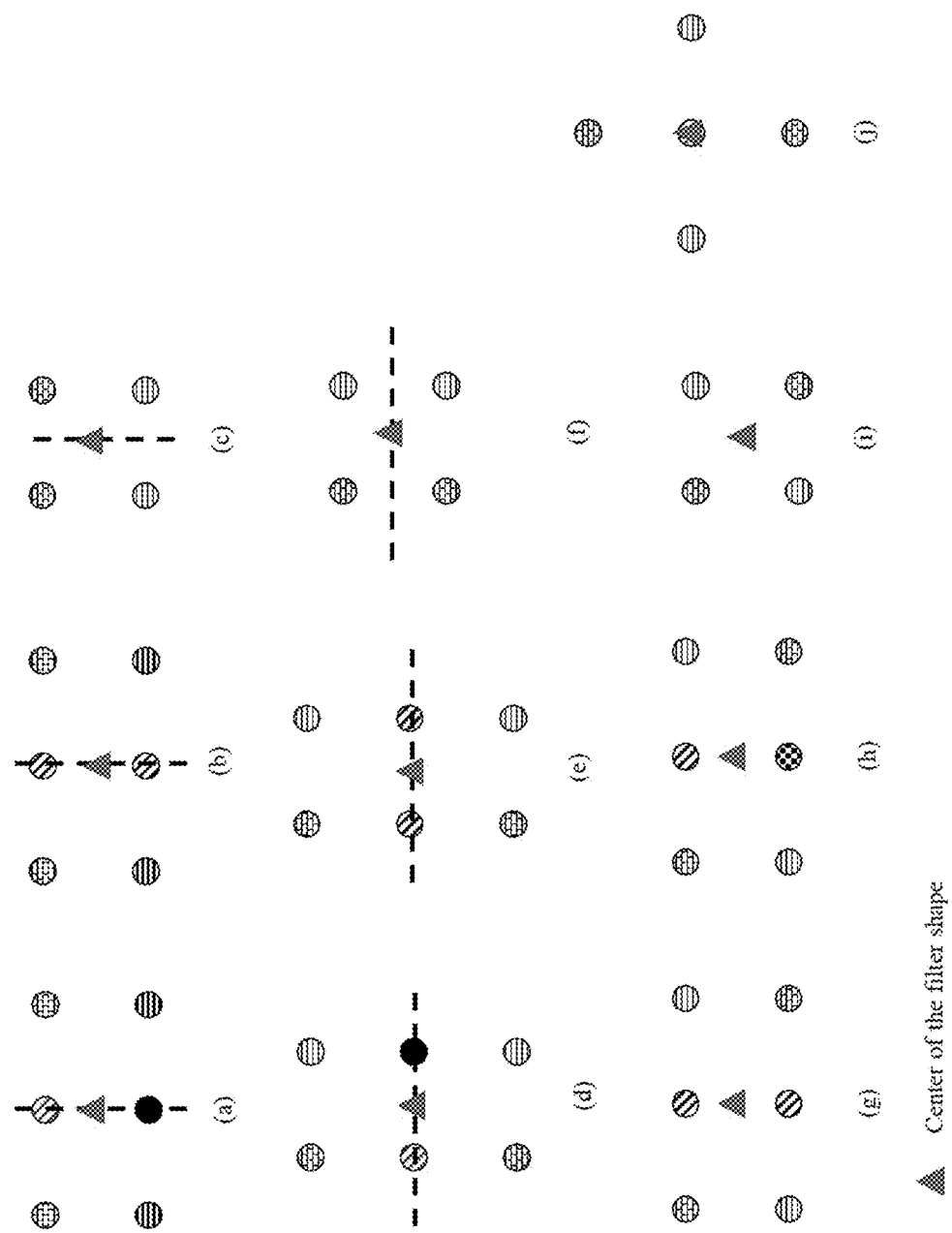
FIG. 17 shows examples of classifying the group of $1^{st}$ color component samples into multiple sets. Samples with same filling pattern belong to one set.

13. How to classify the group of $1^{st}$ color component samples into multiple sets may depend on the filter shape and center of the filter shape in CCPMPM.

a. In one example, in a first classification method, $1^{st}$ color component samples that are symmetric about the vertical line that contains the center of the filter shape may be classified into one set. Examples are shown in FIGS. 17(a)-(c).

i. Alternatively, furthermore, for samples located on the vertical line that contains the center of the filter shape, each sample may be classified into one set.

ii. Alternatively, furthermore, for samples located on the vertical line that contains the center of the filter shape, samples that are symmetric about the center of the filter shape may be classified into one set.

b. In one example, in a second classification method, $1^{st}$ color component samples that are symmetric about the horizontal line that contains the center of the filter shape may be classified into one set. Examples are shown in FIGS. 17(d)-(f).

i. Alternatively, furthermore, for samples located on the horizontal line that contains the center of the filter shape, each sample may be classified into one set.

ii. Alternatively, furthermore, for samples located on the horizontal line that contains the center of the filter shape, samples that are symmetric about the center of the filter shape may be classified into one set.

c. In one example, in a third classification method, $1^{st}$ color component samples that are symmetric about the center of the filter shape may be classified into one set Examples are shown in FIGS. 17(g)-(j).

i. Alternatively, furthermore, for samples located on the horizontal line that contains the center of the filter shape, each sample may be classified into one set.

ii. Alternatively, furthermore, for samples located on the vertical line that contains the center of the filter shape, each sample may be classified into one set.

d. Alternatively, furthermore, if the center of the filter shape is an integer $1^{st}$ color component sample position, it may be classified into a separate set. An example is shown in FIG. 17(j).

e. Alternatively, how to classify the group of $1^{st}$ color component samples into multiple sets may depend on the filter shape and the center sample.

f. Alternatively, the classification of $1^{st}$ color component samples may depend on the $1^{st}$ color component intra prediction direction. For example, horizontal symmetric classification may be applied if the $1^{st}$ color component prediction is close to horizontal direction.

g. In CCPMPM, different classification methods may be used for different filter shapes. For example, the first classification method may be used for a first filter shape, the second classification method may be used for a second filter shape and the third classification method may be used for a third filter shape.

14. One or more sets of multiple filter shapes may be employed in CCPMPM.

a. Alternatively, furthermore, indications of the filter shapes may be signaled in sequence/video/picture/slice/tile/brick/subpicture/tile group/CTU level, such as in SPS/PPS/Picture Header/Slice header.

b. Alternatively, furthermore, the set index and/or the filter shape index may be signaled for a video unit (e.g., a CU/PU/TU/a video sub-region).

15. It is proposed that when deriving the linear parameters in CCPMPM, a first filter shape and a second filter shape may use different sets of neighboring samples.

16. In CCPMPM, the derived linear parameters (e.g., linear coefficients or offset) may be rounded to integer values before being used.

a. In one example, a linear coefficient a(k) may be converted to round(a(k)*$2^N$), wherein the function round(x) round x to integer value towards zero, towards positive infinity or towards negative infinity. N is a positive integer.
      i. Alternatively, furthermore, linear combination of the group of $1^{st}$ color component samples may be right shifted by N.
      ii. Alternatively, furthermore, a rounding offset may be added to the linear combination of the group of $1^{st}$ color component samples before being right shifted by N.

b. In one example, the offset b may be converted to round(b).

17. In above examples, the $1^{st}$ color component samples may be those reconstructed samples before in-loop filtering (e.g., Deblocking filter/SAO/ALF).

a. Alternatively, the $1^{st}$ color component samples may be those reconstructed samples after an in-loop filtering (e.g., Deblocking filter/SAO/ALF).

b. Alternatively, furthermore, the reconstructed samples maybe further modified before being used.
      i. In one example, they may be downsample filtered.
      ii. In one example, they may be filtered by a smoothing filter.

18. In one example, the $1^{st}$ color component may be the luma component and the $2^{nd}$ color component may be the Cb or Cr component.

a. In one example, the $1^{st}$ color component may be the Cb component and the $2^{nd}$ color component may be the Cr component.

b. In one example, the $1^{st}$ color component may be the Cr component and the $2^{nd}$ color component may be the Cb component.

c. In one example, the $1^{st}$ color component may be the R component and the $2^{nd}$ color component may be the G or B color component.

19. It is proposed that a first syntax may be signaled in the sequence/video/picture/slice/tile/subpicture/brick/other video unit (e.g., CTU row/CTU) level to indicate whether CCPMPM is enabled or not.

a. Alternatively, such syntax may be signaled in two levels. For example, a first syntax may be signaled in the sequence/video level. If the first syntax indicates that CCPMPM is used, a second syntax may be further signaled in picture/slice/tile/subpicture/brick/other video unit (e.g., CTU row/CTU) level.

b. In one example, such syntax may be signaled under the condition that cross-component is used for the sequence/video/picture/slice/tile/subpicture/brick/other video unit (e.g., CTU row/CTU).

20. It is proposed that a third syntax may be signaled to indicate whether and/or which CCPMPM mode is used for a block (e.g., coding unit or prediction unit).

a. In one example, the third syntax may be signaled under the condition that CCPMPM is enabled for the picture/slice/tile/subpicture/brick/other video unit (e.g., CTU row/CTU).

b. In one example, the third syntax may be signaled under that condition that cross-component prediction is used for the current block.

21. CCPMPM may be treated as additional CCLM modes in addition to existing ones (e.g., CCLM_A, CCLM_L, CCLM_AL).

a. Alternatively, furthermore, the number of allowed CCLM modes may be increased and the CCLM mode index (e.g., cclm_mode_idx) may be signalled based on the increased number.

b. Alternatively, furthermore, if the CCPMPM mode is selected, the cclm_mode_flag shall be equal to 1.

c. Alternatively, furthermore, CCPMPM modes may be assigned with larger indices compared to exiting CCLM modes.

22. CCPMPM may be treated as a new category which is different from CCLM modes.

a. Alternatively, furthermore, indication of the new category may be signalled when the CCLM is not applied to a block, such as the cclm_mode_flag shall be equal to 0.

Inter-Prediction with Multiple-Parameter Model (IPMPM)

23. The proposed method of CCPMPM may be extended for processing LIC (Local Illumination Compensation)-coded blocks. That is, for predicting the $1^{st}$ color component of a LIC-coded block, the $2^{nd}$ color component of the LIC-coded block may be utilized, such as luma to predict chroma samples.

24. It is proposed that CCPMPM may be extended to inter-prediction. Instead of using a group of $1^{st}$ color component samples to predict a $2^{nd}$ color component sample, a group of reference samples may be used to predict a sample in the current video block.

a. In one example, the reference samples may be identified by the motion vectors of the current block.

b. In one example, the reference samples may be identified by modified motion vectors of the current block. For example, the modified motion vector may be the integer part of the motion vector.

c. In one example, one set of linear coefficients and/or offset may be derived for each prediction direction.

d. In one example, one set of linear coefficients and/or offset may be derived for each motion vector of the current block.

e. Alternatively, furthermore, the derivation of linear coefficients/offset may be dependent on the neighboring samples of the same color component.

25. It is proposed that a first syntax may be signaled in the sequence/video/picture/slice/tile/subpicture/brick/other video unit (e.g., CTU row/CTU) level to indicate whether IPMPM is enabled or not.

a. Alternatively, such syntax may be signaled in two levels. For example, a first syntax may be signaled in the sequence/video level. If the first syntax indicates that IPMPM is used, a second syntax may be further signaled in picture/slice/tile/subpicture/brick/other video unit (e.g., CTU row/CTU) level.

26. It is proposed that a third syntax may be signaled to indicate whether and/or which IPMPM mode is used for a block (e.g., coding unit or prediction unit).
   a. In one example, the third syntax may be signaled under the condition that IPMPM is enabled for the picture/slice/tile/subpicture/brick/other video unit (e.g., CTU row/CTU).
   b. In one example, the third syntax may be a flag.
   c. In one example, whether the third syntax is signaled or not may depend on the coding mode of the block.
      i. In one example, the third syntax may be signaled in Advanced Motion Vector Prediction (AMVP) mode.
      ii. In one example, the third syntax may not be signaled in certain modes. For example, the third syntax may not be signaled in the following modes:
         1. Merge mode
         2. Sub-block merge mode
         3. Intra block copy mode
         4. Affine mode
         5. Palette mode
         6. Intra mode
   d. In one example, the third syntax may be stored for a block and used for its following coded/decoded blocks.
   e. In one example, the third syntax may be inherited in merge mode.
      i. For example, if motion information of a spatial neighboring block is inherited by the current block, the third syntax may of the same spatial neighboring block may also be inherited by the block.
      ii. For example, if motion information of a temporal neighboring block is inherited by the current block, the third syntax may of the same temporal neighboring block may also be inherited by the block.
   f. In one example, the third syntax may be stored in a History-based Motion Vector Prediction (HMVP) table together with the associated motion information.
      i. Alternatively, furthermore, if a HMVP candidate is inherited by a block, the associated third syntax may also be inherited.

5. Embodiment Examples 5.1 Embodiment of Signalling on Signal sps_joint_cbcr_enabled_flag The proposed changes on top of JVET-P2001-v14 are described in below, where newly added changes are highlighted in bold underlined italicized text.

7.3.2.3 Sequence Parameter Set RBSP Syntax

|  | Descriptor |
| --- | --- |
| seq_parameter_set_rbsp( ) { |  |
|    sps_decoding_parameter_set_id | u(4) |
| ... |  |
|    if(ChromaArrayType != 0 ) |  |
|      sps_joint_cbcr_enabled_flag | u(1) |
| ... |  |

7.4.3.3 Sequence Parameter Set RBSP Semantics sps_joint_cbcr_enabled_flag equal to 0 specifies that the joint coding of chroma residuals is disabled. sps_joint_cbcr_enabled_flag equal to 1 specifies that the joint coding of chroma residuals is enabled. *__When sps_join_cbcr_enabled_flag is not present, it is inferred to be equal to 0.__*

6. Example Implementations of the Disclosed Technology

Figure 18:
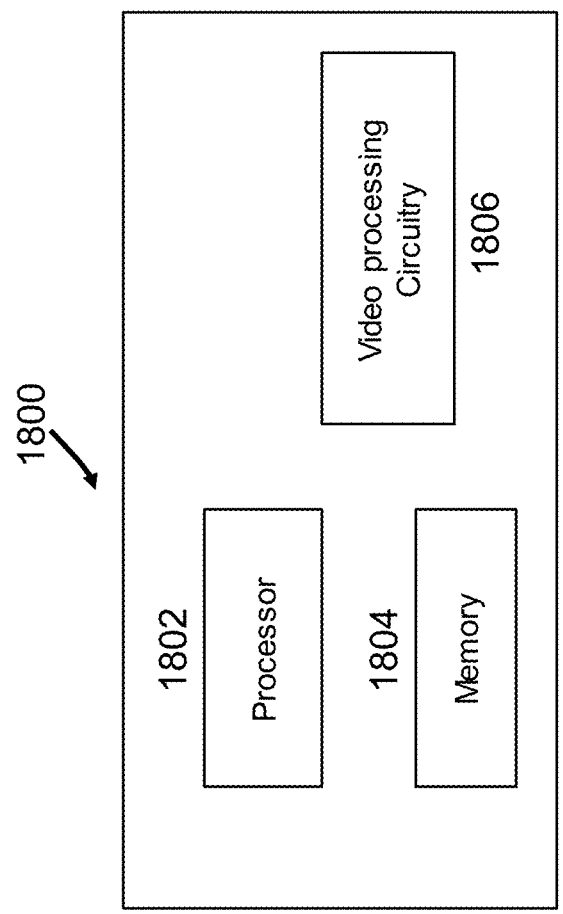
FIG. 18 is a block diagram of an example of a hardware platform for implementing a visual media decoding or a visual media encoding technique described in the present document.

FIG. 18 is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806. The processor(s) 1802 may be configured to implement one or more methods described in the present document. The memory (memories) 1804 may be used for storing data and code used for implementing the methods and techniques described herein. The video processing hardware 1806 may be used to implement, in hardware circuitry, some techniques described in the present document, and may be partly or completely be a part of the processors 1802 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 19:
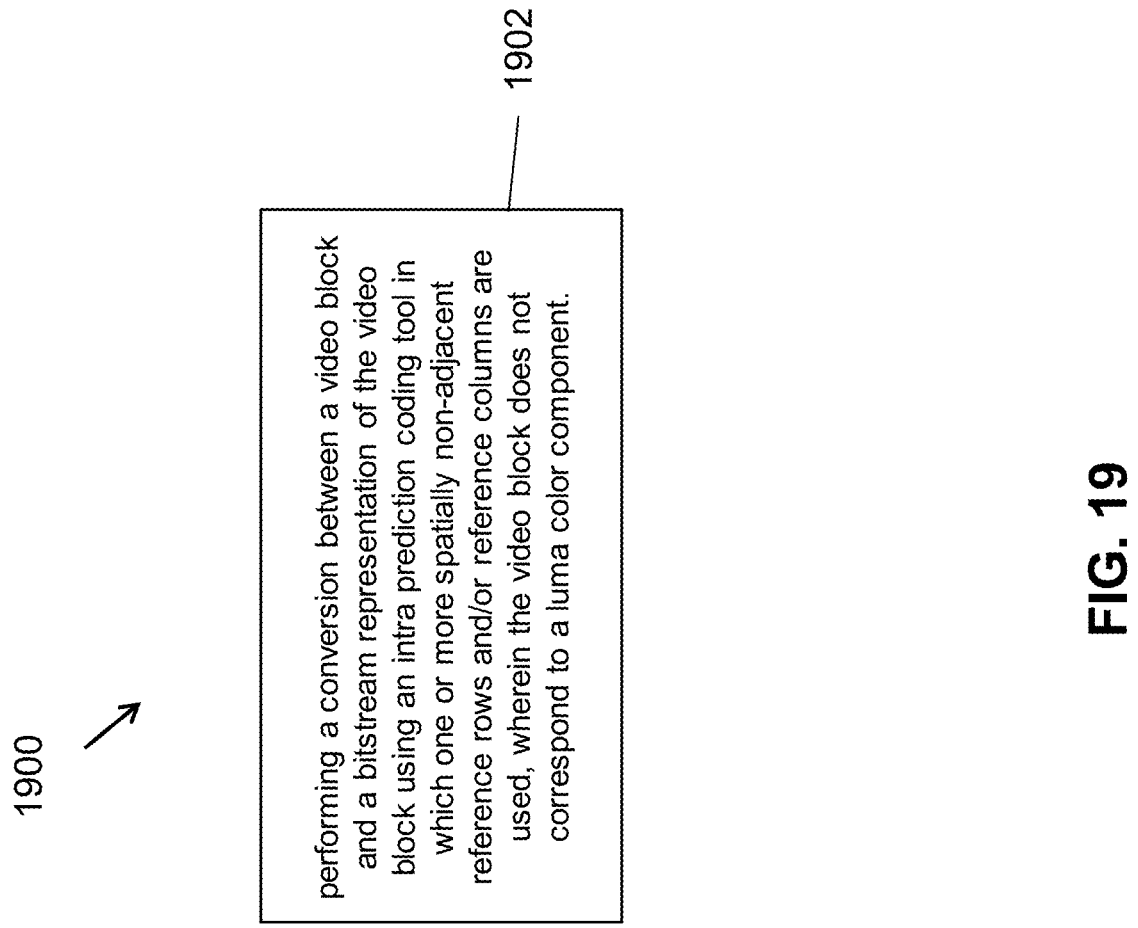
FIG. 19 shows a flowchart of an example method for video coding.

FIG. 19 is a flowchart for an example method 1900 of video processing. The method 1900 includes, at 1904, performing a conversion between a video block and a bitstream representation of the video block using an intra prediction coding tool in which one or more spatially non-adjacent reference rows and/or reference columns are used, wherein the video block does not correspond to a luma color component.

Some embodiments may be described using the following clause-based format.

1. A method of video processing, comprising: performing a conversion between a video block and a bitstream representation of the video block using an intra prediction coding tool in which one or more spatially non-adjacent reference rows and/or reference columns are used, wherein the video block does not correspond to a luma color component.

2. The method of clause 1, wherein the one or more spatially non-adjacent reference rows and/or reference columns are used for at least one of: (1) generating a reduced reference signal, (2) upsampling a reduced prediction signal, or (3) generating a matrix-based intra prediction (MIP) signal.

3. The method of any one or more of clauses 1-2, wherein, spatially adjacent reference rows and/or reference columns are used in addition to using the one or more spatially non-adjacent reference rows and/or reference columns.

4. The method of any one or more of clauses 1-3, wherein a usage of the one or more spatially non-adjacent reference rows and/or reference columns is indicated in the bitstream representation.

5. The method of any one or more of clauses 1-4, wherein a multiple reference line (MRL) flag is enabled in the bitstream representation.

6. The method of clause 5, wherein the intra prediction coding tool is associated with a combined intra-inter prediction (CIIP) mode.

7. The method of any one or more of clauses 5-6, wherein the intra prediction coding tool is associated with a Block-based Delta PCM (BDPCM) mode.

8. A method of video processing, comprising: performing a conversion between a video block and a bitstream representation of the video block using an intra prediction tool in which a color component sample of a second type of the video block is predicted using a model based on a linear combination of multiple color component samples of a first type, and wherein, in the model, linear coefficients associated with color component samples of the first type are derived or individually signaled in the bitstream representation.

9. The method of clause 8, wherein a prediction error representing a difference between an original sample value and a predicted sample value is indicated in the bitstream representation.

10. The method of any one or more of clauses 8-9, wherein the model includes a use of an offset for addition to the linear combination of the multiple color component samples of the first type.

11. The method of clause 8, wherein the multiple color component samples of the first type are classified into one or more groups of color component samples, and wherein each group of color component samples is associated with one linear coefficient.

12. The method of clause 11, wherein a classification into the one or more groups of color component samples is defined in accordance with a shape of a filter spatially centered on a color component sample of the first type.

13. The method of clause 12, wherein the color component sample of the first type is selected based on a color format of the color component sample of the first type and a position of the color component sample of the second type.

14. The method of clause 13, wherein, if the color component sample of the second type is located at (x, y) and the color format of the color component sample of the first type is a 4:4:4 format, then the color component sample of the first type is selected from a location (x, y).

15. The method of clause 13, wherein, if the color component sample of the second type is located at (x, y) and the color format of the color component sample of the first type is a 4:2:2 format, then the color component sample of the first type is selected from a location (2*x, y).

16. The method of clause 13, wherein, if the color component sample of the second type is located at (x, y) and the color format of the color component sample of the first type is a 4:2:0 format, then the color component sample of the first type is selected from a location (2*x, 2*y).

17. The method of any one or more of clauses 12-16, wherein the shape of the filter is one of: a N1-point rectangular shape, a N1-point square shape, a N2-point diamond shape, a N4-point hexagon shape, or a N5-point octagon shape, wherein N1, N2, N3, N4 and N5 are positive integers.

18. The method of any one or more of clauses 12-17, wherein the shape of the filter is selected in accordance with the intra prediction tool used in the conversion.

19. The method of any one or more of clauses 12-17, wherein the shape of the filter used in computing the linear coefficients is same as the shape of the filter used in computing offsets associated with the linear coefficients.

20. The method of clause 19, wherein a least squares technique is used in deriving the linear coefficients and the offsets associated with the linear coefficients.

21. The method of clause 8, wherein the multiple color component samples of the first type are co-located inside a region relative to a location of the video block.

22. The method of clause 21, wherein the multiple color component samples of the first type are co-located in a left direction of the video block.

23. The method of clause 21, wherein the multiple color component samples of the first type are co-located in an above direction of the video block.

24. The method of clause 21, wherein the multiple color component samples of the first type are distributed inside a first region and a second region, wherein each region is associated with a prediction tool.

25. A method of video processing, comprising: performing a conversion between a video block and a bitstream representation of the video block using an intra prediction tool in which a color component sample of a second type of the video block is predicted using a model based on a linear combination of multiple color component samples of a first type, and wherein the multiple color component samples of the first type are classified into one or more groups of color component samples in accordance with a rule that depends on a shape of a filter spatially centered on a color component sample of the first type.

26. The method of clause 25, wherein the color component samples of the first type that are located symmetrically about a vertical line passing through a center of the filter are classified into a single group.

27. The method of clause 25, wherein the color component samples of the first type that are located on a vertical line passing through a center of the filter are classified into a single group.

28. The method of clause 25, wherein the color component samples of the first type that are located symmetrically about a center of the filter are classified into a single group.

29. The method of clause 25, wherein the color component samples of the first type that are located symmetrically about a horizontal line passing through a center of the filter are classified into a single group.

30. The method of clause 25, wherein the color component samples of the first type that are located on a horizontal line passing through a center of the filter are classified into a single group.

31. The method of clause 25, wherein if the color component sample of the first type at the center of the filter is located at an integer-valued position, classifying the color component sample of the first type into a group different from a group including the multiple color component samples of the first type.

32. The method of clause 25, wherein the rule specifies using an intra prediction direction for classifying the multiple color component samples of the first type into the one or more groups.

33. The method of clause 25, wherein the rule specifies using a first filter shape for classifying the color component sample of the first type into a first group and a second filter shape for classifying the color component sample of the first type into a second group.

34. The method of clause 25, wherein an indication of the shape of the filter used is signaled in the bitstream representation.

35. The method of clause 25, wherein an index indicative of a group identification is signaled in the bitstream representation.

36. A method of video processing, comprising: performing a conversion between a video block and a bitstream representation of the video block using an intra prediction tool in which a color component sample of a second type of a video block is predicted using a model based on a linear combination of multiple color component samples of a first type, and wherein the multiple color component samples of the first type are classified into one or more groups of color component samples in accordance with a shape of a filter spatially centered on a color component sample of the first type such that a first filter shape and a second filter shape utilize different groups of neighboring samples.

37. A method of video processing, comprising: performing a conversion between a video block and a bitstream representation of the video block using an intra prediction tool in which a color component sample of a second type of the video block is predicted using a model based on a linear combination of multiple color component samples of a first type, and wherein, in the model, linear coefficients and offsets associated with color component samples of the first type are derived or individually signaled in the bitstream representation.

38. The method of clause 37, wherein the linear coefficients and/or the offsets are rounded to integer values before usage.

39. The method of clause 37, wherein the linear coefficients and/or the offsets are right-shifted before usage.

40. The method of clause 37, wherein the linear coefficients and/or the offsets are subjected to a rounding operation and a right-shifting operation.

41. The method of clause 37, wherein the multiple color component samples of the first type are samples that are reconstructed before performing an in-loop filtering step.

42. The method of clause 41, wherein the in-loop filtering step uses a deblocking filter, a sample adaptive offset (SAO) step, or an ALF filter.

43. The method of clause 41, wherein the samples that are reconstructed before performing an in-loop filtering step are subjected to additional modifications.

44. The method of clause 43, wherein the additional modifications include applying a smoothing filter.

45. The method of clause 43, wherein the additional modifications include applying a downsampling filter.

46. The method of clause 37, wherein the color component sample of the first type is a luma component and the color component sample of the second type is a Cb or a Cr component 47. The method of clause 37, wherein the color component sample of the first type is a Cb component and the color component sample of the second type is a Cr component.

48. The method of clause 37, wherein the color component sample of the first type is a Cr component and the color component sample of the second type is a Cb component.

49. The method of clause 37, wherein the color component sample of the first type is a R component and the color component sample of the second type is a G or a B component.

50. The method of clause 37, wherein an indication of usage of the model based on the linear combination of multiple color component samples of the first type is signaled in the bitstream representation.

51. The method of clause 50, wherein the usage is signaled using a 2-level syntax, a first syntax in a sequence/video level and a second syntax in a picture/slice/tile/subpicture/brick/video unit level.

52. The method of clause 51, wherein the second syntax is signaled only if the first syntax indicates the usage of the model.

53. The method of any one or more of clauses 51-52, wherein a third syntax is signaled in the bitstream representation in a block level to indicate whether the model is used for the video block.

54. The method of any one or more of clauses 37-53, wherein a usage of the model based on the linear combination of multiple color component samples is signaled as a cross-component linear model (CCLM) coding tool.

55. The method of any one or more of clauses 37-53, wherein a usage of the model based on the linear combination of multiple color component samples is signaled as a coding tool when a cross-component linear model (CCLM) coding tool is not used.

56. The method of any one or more of clauses 37-53, wherein the model based on the linear combination of multiple color component samples is applicable for processing a local illumination compensation (LIC) coded video block.

57. A method of video processing, comprising: performing a conversion between a video block and a bitstream representation of the video block using an inter prediction tool in which a color component sample of the video block is predicted using a model based on a linear combination of multiple reference samples, and wherein, in the model, linear coefficients and offsets associated with color component samples of the first type are derived or individually signaled in the bitstream representation.

58. A video decoding apparatus comprising a processor configured to implement a method recited in one or more of clauses 1 to 57.

59. A video encoding apparatus comprising a processor configured to implement a method recited in one or more of clauses 1 to 57.

60. A computer program product having computer code stored thereon, the code, when executed by a processor, causes the processor to implement a method recited in any of clauses 1 to 57.

61. A method, apparatus or system described in the present document.

Figure 20:
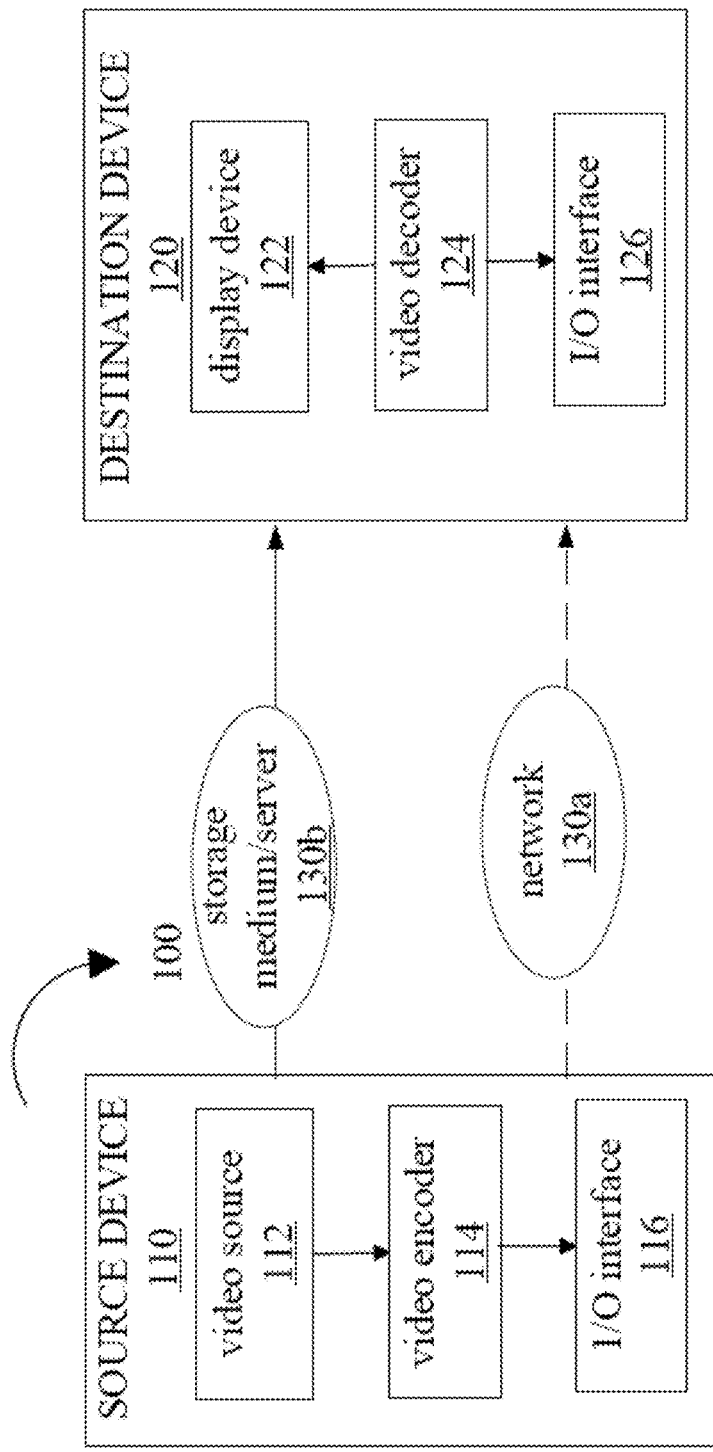
FIG. 20 is a block diagram that illustrates an example video coding system.

FIG. 20 is a block diagram that illustrates an example video coding system 100 that may utilize the techniques of this disclosure.

As shown in FIG. 20, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 21:
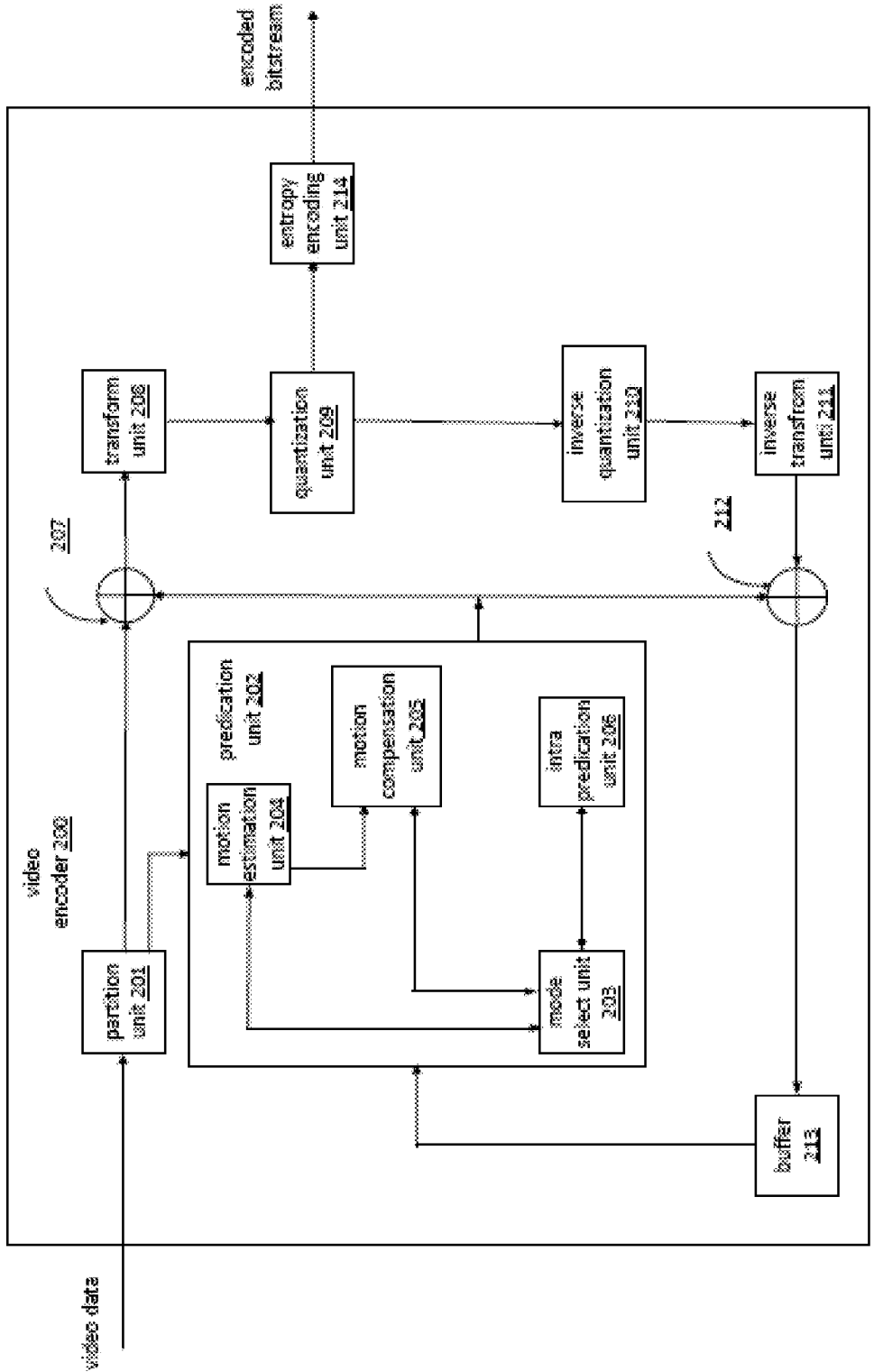
FIG. 21 is a block diagram that illustrates an encoder in accordance with some embodiments of the present disclosure.

FIG. 21 is a block diagram illustrating an example of video encoder 200, which may be video encoder 114 in the system 100 illustrated in FIG. 20.

Video encoder 200 may be configured to perform any or all of the techniques of this disclosure. In the example of FIG. 21, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy(IBC) unit The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 21 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 22:
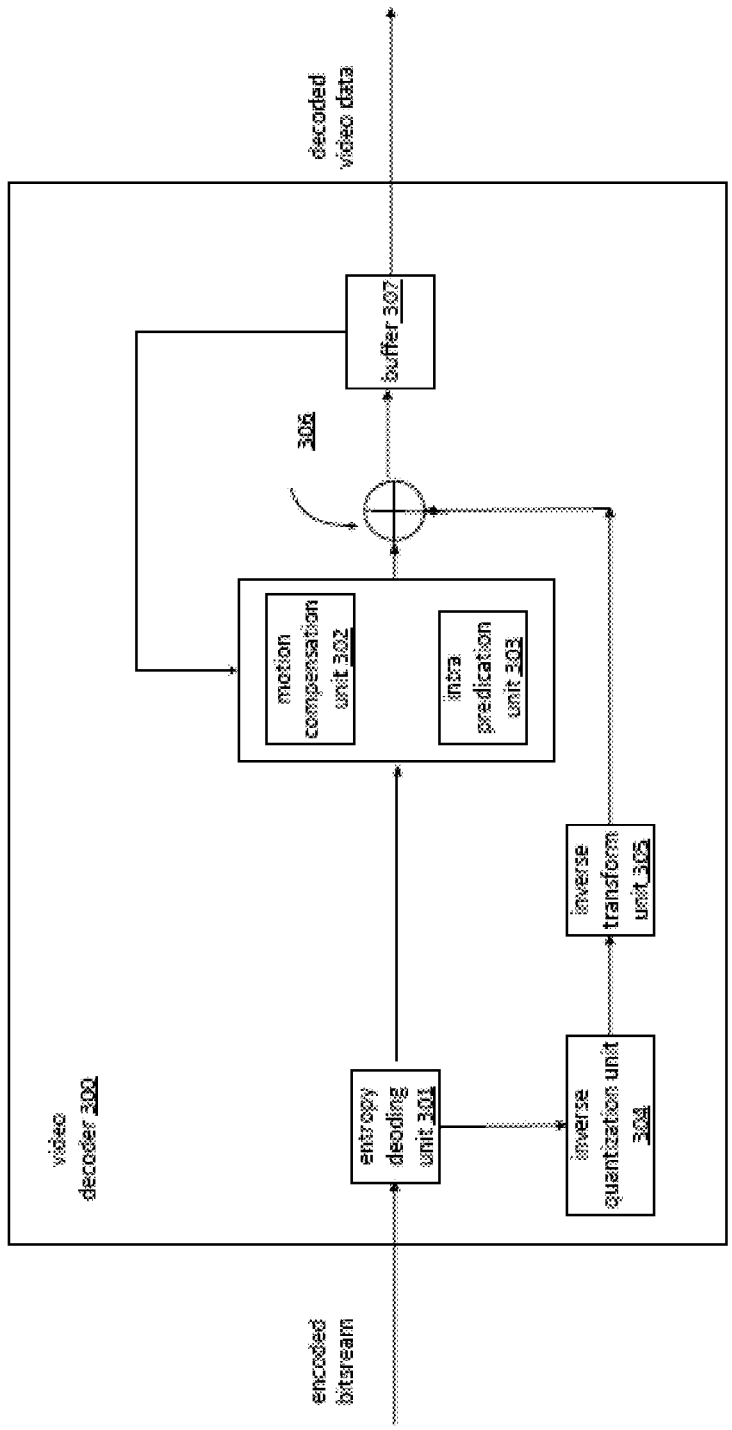
FIG. 22 is a block diagram that illustrates a decoder in accordance with some embodiments of the present disclosure.

FIG. 22 is a block diagram illustrating an example of video decoder 300 which may be video decoder 114 in the system 100 illustrated in FIG. 20.

The video decoder 300 may be configured to perform any or all of the techniques of this disclosure. In the example of FIG. 21, the video decoder 300 includes a plurality of functional components. The techniques described in this disclosure may be shared among the various components of the video decoder 300. In some examples, a processor may be configured to perform any or all of the techniques described in this disclosure.

In the example of FIG. 22, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 21).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Various techniques disclosed in the present document may be preferably implemented by the following technical solutions in various embodiments.

A first set of solutions is listed below.

For example, the following solutions may be implemented according to the above-listed items in Section 4, e.g., item 1.

Figure 23B:
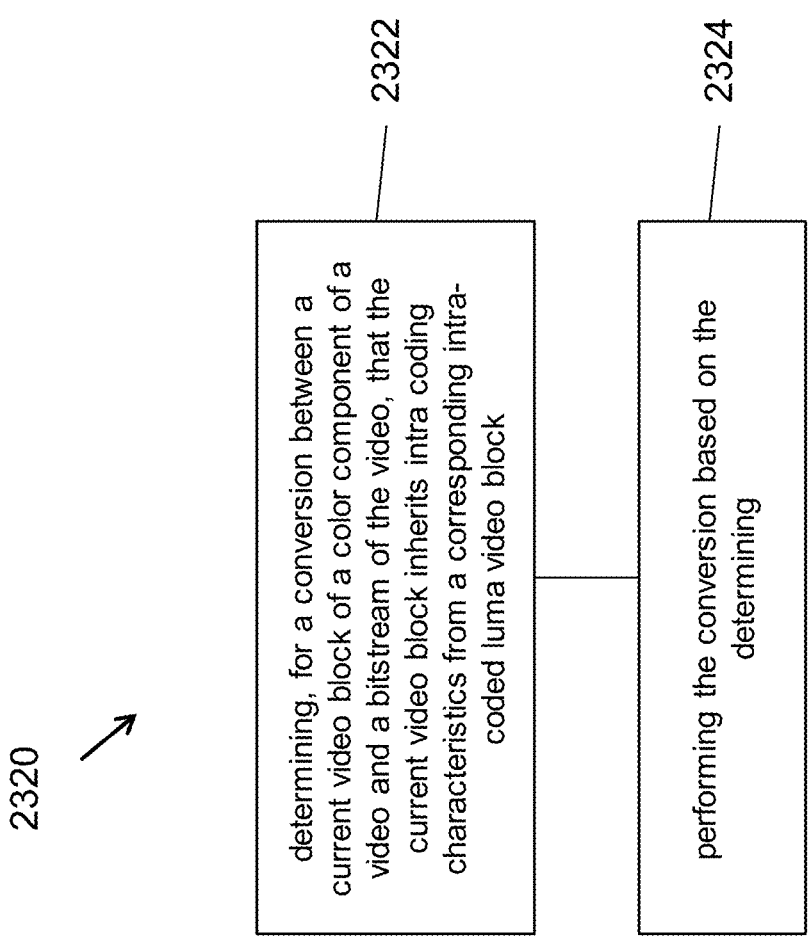

1. A method of video processing (e.g., method 2310 depicted in FIG. 23A), comprising performing (2312) a conversion between a current video block of a video and a bitstream of the video using an intra prediction coding tool in which one or more reference lines are selectively used for prediction according to a rule, wherein the bitstream conforms to a format rule; wherein the current video block is of a color component that is different from a luma color component of the video.

2. The method of solution 1, wherein the color component is a Cb component or a Cr component or an R component or a G component or a B component.

3. The method of any of solutions 1-2, wherein the rule specifies to use spatially non-adjacent reference lines.

4. The method of any of solutions 1-2, wherein the rule specifies to use one or more reference lines including lines that are 0, 1 or 2 columns to left or 0, 1 or 2 rows above that of the current video block.

5. The method of any of solutions 1-4, wherein the bitstream includes an identification of the one or more reference lines.

6. The method of solution 5, wherein the identification is included at a sequence level, a video level, a picture level, a slice level, a tile level, a subpicture level, a brick level, a coding tree unit level, or a coding tree unit row level.

7. The method of any of solutions 5-6, wherein the identification is included in a parameter set, wherein the parameter set includes a video parameter set, a sequence parameter set, an adaptation parameter set, or a picture parameter set.

8. The method of any of solutions 5-7, wherein the identification is included in a picture header, a slice header, a tile group header or a coding tree unit header.

For example, the following solutions may be implemented according to the above-listed items in Section 4, e.g., item 2.

9. The method of any of solutions 1-8, wherein the format rule specifies whether and how the one or more reference lines are identified in the bitstream.

10. The method of solution 9, wherein the format rule specifies that the one or more reference lines are implicitly identified in the bitstream.

11. The method of solution 9, wherein the format rule specifies that the one or more reference lines are identified in the bitstream using a first syntax structure that indicates whether the one or more reference lines are used for the conversion.

12. The method of solution 11, wherein the format rule specifies that the bitstream includes a second syntax element indicating which non-adjacent reference lines are used by the intra prediction coding tool.

13. The method of solution 11 or 12, wherein the format rule specifies that the bitstream includes a third syntax element indicating which non-adjacent reference lines of the color component are used by the intra prediction coding tool for intra prediction.

14. The method of solution 13, wherein the first syntax structure is a flag and/or the second syntax structure is an index and/or the third syntax structure is another index.

15. The method of solution 12 or 13, wherein the second syntax structure or the third syntax structure is coded as a binary value.

16. The method of solution 12 or 13, wherein the second syntax structure or the third syntax structure is coded as a non-binary value.

17. The method of any of solutions 9-10, wherein the format rule specifies that an index to the one or more reference lines is derivable for the current video block based on a reference line index of a reference luma block associated with the current block and adjacent chroma samples relative to the current video block.

For example, the following solutions may be implemented according to the above-listed items in Section 4, e.g., item 4.

18. The method of any of solutions 1-17, wherein the rule specifies whether to use the one or more reference lines and/or how to use the one or more reference lines depends on a color format of the video.

19. The method of solution 18, wherein the rule specifies that use of the of the one or more reference lines that are non-adjacent to the current video block is disabled in case that the color format is 4:2:0.

20. The method of solution 18, wherein the rule specifies that use of the of the one or more reference lines that are non-adjacent to the current video block is enabled due to the color format being 4:4:4.

For example, the following solutions may be implemented according to the above-listed items in Section 4, e.g., item 4.

21. The method of solution 18, wherein the rule specifies that whether a non-adjacent line from the one or more reference lines is used depends on whether the non-adjacent line is to a left of the current video block or above the current video block.

22. The method of solution 18, wherein the rule specifies that a first number of non-adjacent lines to a left of the current video block are used or a second number of non-adjacent lines above the current video block are used, wherein the first number is different from the second number.

For example, the following solutions may be implemented according to the above-listed items in Section 4, e.g., item 6.

23. The method of solution 1, wherein the rule specifies that the current video block is coded using a matrix based intra prediction (MIP) mode and wherein the one or more reference lines include one or more non-adjacent reference lines.

24. The method of solution 23, wherein the one or more non-adjacent reference lines are used for generating a reduced reference signal.

25. The method of any of solutions 23-24, wherein the one or more non-adjacent reference lines are used for up sampling a reduced prediction signal.

26. The method of solution 23, wherein the rule specifies that adjacent and non-adjacent reference lines are both used to generate an MIP prediction signal.

27. The method of solution 23, wherein the format rule specifies that the bitstream includes an indication of the one or more reference lines.

For example, the following solutions may be implemented according to the above-listed items in Section 4, e.g., item 7.

28. The method of solution 1, wherein the rule specifies that the one or more reference lines are used due to the intra prediction coding tool being a combined intra-inter prediction (CIIP) mode.

29. The method of solution 1, wherein the rule specifies that the one or more reference lines are used due to the intra prediction coding tool being a block delta pulse code modulation (BDPCM) coding tool.

For example, the following solutions may be implemented according to the above-listed items in Section 4, e.g., item 3.

30. A method of video processing (e.g., method 2320 depicted in FIG. 23B), comprising determining (2322), for a conversion between a current video block of a color component of a video and a bitstream of the video, that the current video block inherits intra coding characteristics from a corresponding intra-coded luma video block; and performing (2324) the conversion based on the determining.

31. The method of solution 30, wherein the current video block is coded in the bitstream using a dependent mode that indicates that the current video block is coded using a same prediction direction or a prediction reference line as the corresponding intra-coded luma video block.

32. The method of any of solutions 30-31, wherein a color format of the video determines whether and/or how the current video block inherits the intra coding characteristics.

A second set of solutions is listed below.

For example, the following solutions may be implemented according to the above-listed items in Section 4, e.g., item 8.

1. A method of video processing (e.g., method 2330 depicted in FIG. 23C), comprising performing (2332) a conversion between a current video block of a second color component of a video and a bitstream of the video using a cross-component prediction with multiple-parameter model (CCPMPM) in which samples of the current video block are predictively coded in the bitstream using a linear combination of samples of a first color component multiplied by linear coefficients and/or one or more offsets; wherein the bitstream conforms to a format rule; and wherein the linear coefficients of the CCPMPM are determined using a first rule; and wherein the samples of the first color component are determined using a second rule.

For example, the following solutions may be implemented according to the above-listed items in Section 4, e.g., item 9.

2. The method of solution 1, wherein the samples of the first color component include multiple groups of samples of the first color component, wherein one of the linear coefficients is applied to each sample in a group of the first color component.

3. The method of solution 2, wherein the one or more offsets include offsets applied to the linear combination of each group of samples of the first color components.

For example, the following solutions may be implemented according to the above-listed items in Section 4, e.g., item 10.

4. The method of any of solutions 1-2, wherein each of the multiple groups of samples of the first color component are defined by a filter shape and a center sample of the group.

5. The method of solution 4, wherein the center samples depend on a color format of the video and/or a position of a sample of the second color component that is predicted, wherein the color format is 4:4:4, 4:2:2 or 4:2:0.

6. The method of solution 5, wherein, in case that the sample of the second color component is located as (x, y), then the center sample is at a position (x, y) in the first color component in case of 4:4:4 format, where x and y represent fractional or integer sample position numbers.

7. The method of solution 5, wherein, in case that the sample of the second color component is located as (x, y), then the center sample is at a position (2*x, y) in the first color component in case of 4:2:2 format, where x and y represent fractional or integer sample position numbers.

8. The method of solution 5, wherein, in case that the sample of the second color component is located as (x, y), then the center sample is at a position (2*x, 2*y) in the first color component in case of 4:2:0 format, where x and y represent fractional or integer sample position numbers.

9. The method of any of solutions 4-8, wherein the filter shape is one of an N1-point rectangle or an N3 point a square, an N2-point diamond, an N4-point hexagon or an N5-point octagon, wherein N1, N2, N3, N4 and N5 are positive integers.

10. The method of solution 9, wherein the filter shape for the current video block is dependent on an intra prediction mode used for coding the current video block.

For example, the following solutions may be implemented according to the above-listed items in Section 4, e.g., item 11.

11. The method of any of solutions 4-10, wherein the first rule and the second rule specify that same shapes of samples are used for deriving the linear coefficients and/or the one or more offsets and the linear prediction.

12. The method of solution 11, wherein the first rule specifies that the linear coefficients and/or the one or more offsets are derived using a least square sum calculation operation.

For example, the following solutions may be implemented according to the above-listed items in Section 4, e.g., item 13.

13. The method of any of solutions 4-12, wherein the multiple groups of samples are classified into sets by a classification method according to the filter shapes and the center samples of the groups and/or centers of the filter shapes.

14. The method of solution 13, wherein the classification method includes classifying samples of the first color component into groups according to a symmetry about a vertical line that contains a center of the filter shape.

15. The method of solution 14, wherein the classification method further includes classifying samples located on the vertical line into one group.

16. The method of solution 14, wherein the classification method further includes classifying samples located on the vertical line and samples that are symmetric about the center of the filter shape into one group.

17. The method of solution 13, wherein the classification method includes classifying samples of the first color component into groups according to a symmetry about a horizontal line that contains a center of the filter shape.

18. The method of solution 17, wherein the classification method further includes classifying samples located on the horizontal line into one group.

19. The method of solution 17, wherein the classification method further includes classifying samples located on the horizontal line and samples that are symmetric about the center of the filter shape into one group.

20. The method of solution 13, wherein the classification method includes classifying samples of the first color component into groups according to a symmetry about a center of the filter shape.

21. The method of solution 13, wherein the classification method includes classifying samples of the first color component located on a horizontal line that contains a center of the filter shape into a group.

22. The method of solution 13, wherein the classification method includes classifying samples of the first color component located on a vertical line that contains a center of the filter shape into a group.

23. The method of solution 13, wherein the classification method includes, in case that a center of the filter shape is at an integer sample position, classifying the center of the filter shape into a separate group.

24. The method of any of solutions 4-12, wherein the multiple groups of samples are classified into sets by a classification method according to a direction of intra prediction.

25. The method of solution 24, wherein, in case that the direction of intra prediction is closer to a horizontal prediction than a vertical prediction, then a horizontal symmetry is used for the classification method.

26. The method of any of solutions 13-25, wherein a different classification method is used for each different filter shape.

For example, the following solutions may be implemented according to the above-listed items in Section 4, e.g., item 12.

27. The method of any of solutions 1-26, wherein the first rule specifies that the linear coefficients are determined using samples in a specific region relative to the current video block.

28. The method of solution 27, wherein the specific region is to a left of the current video block.

29. The method of solution 27, wherein the specific region is above the current video block.

30. The method of solution 27, wherein the first rule specifies that a position of the specific region defines a mode of the CCPMPM.

For example, the following solutions may be implemented according to the above-listed items in Section 4, e.g., item 14.

31. The method of any of solutions 1-30, wherein the second rule specifies use of multiple filter shapes for determining the samples of the first color component.

32. The method of solution 31, wherein the format rule specifies that the multiple filter shapes are indicated in the bitstream at a sequence level or a video level or a picture level or a slice level or a tile level or a subpicture level or a brick level or a video unit level, wherein the video unit is a coding tree unit or a coding tree unit level, in a picture header or a slice header.

33. The method of solution 31, wherein the format rule specifies that the multiple filter shapes are indicated in a sequence parameter set or a picture parameter set.

For example, the following solutions may be implemented according to the above-listed items in Section 4, e.g., item 15.

34. The method of solution 1, wherein the first rule specifies that the linear coefficients of the CCPMPM are determined using a first set of neighboring samples according to a first filter shape and a second set of neighboring samples according to a second filter shape, wherein the first set and the second set include at least some different samples.

For example, the following solutions may be implemented according to the above-listed items in Section 4, e.g., item 16.

35. The method of any of solutions 1-34, wherein the first rule specifies that the linear coefficients are determined by rounding calculations of the linear coefficients to integer values.

36. The method of solution 35, wherein the first rule specifies that a linear coefficient a(k) is converted to round $(a(k)*2^N)$, wherein the function round(x) rounds x to integer value towards zero, towards positive infinity or towards negative infinity, and N is a positive integer.

37. The method of any of solutions 1-34, wherein, a right-shifting by N is used when determining a cross-component prediction of samples of the current video block, where N is a positive integer.

38. The method of any of solutions 1-34, wherein, addition of a rounding offset followed by a right-shifting by N is used when determining a cross-component prediction of samples of the current video block.

39. The method of solution 38, wherein the rounding offset b is converted to round(b).

For example, the following solutions may be implemented according to the above-listed items in Section 4, e.g., item 17.

40. The method of any of solutions 1-39, wherein the samples of the first color component comprise reconstructed samples of the video prior to in-loop filtering.

41. The method of any of solutions 1-39, wherein the samples of the first color component comprise reconstructed samples of the video after an in-loop filtering.

42. The method of solution 41, wherein the in-loop filtering comprises deblocking filtering or a sample adaptive offset or an adaptive loop filter.

43. The method of any of solutions 1-39, wherein the samples of the first color component comprise reconstructed samples that have been downsample filtered.

44. The method of any of solutions 1-39, wherein the samples of the first color component comprise reconstructed samples that have been filtered by a smoothing filter.

For example, the following solutions may be implemented according to the above-listed items in Section 4, e.g., item 8.

45. The method of any of solutions 1-44, wherein the first color component is a luma component and the second color component is a Cr or Cb component.

46. The method of any of solutions 1-44, wherein the first color component is a Cb component and the second color component is a Cr component.

47. The method of any of solutions 1-44, wherein the first color component is a Cr component and the second color component is a Cb component.

48. The method of any of solutions 1-44, wherein the first color component is an R component and the second color component is a G component.

For example, the following solutions may be implemented according to the above-listed items in Section 4, e.g., item 19.

49. The method of any of solutions 1-48, wherein the format rule specifies that one or more syntax elements are included in the bitstream to indicate whether the CCPMPM is used for the current video block.

50. The method of solution 49, wherein the one or more syntax elements comprise a first syntax element that is includes at a sequence level or a video level or a picture level or a slice level or a tile level or a subpicture level or a brick level or a video unit level, wherein the video unit level corresponds to a coding tree unit or a coding tree unit row.

51. The method of solution 49, wherein the one or more syntax elements include a first syntax element at a sequence or a video level and a second syntax element that is conditionally included at a picture level or a slice level or a tile level or a subpicture level or a brick level or a video unit level, wherein the video unit level corresponds to a coding tree unit or a coding tree unit row.

52. The method of solution 51, wherein the second syntax element is included in the bitstream in case that a cross-component prediction is enabled.

For example, the following solutions may be implemented according to the above-listed items in Section 4, e.g., item 20.

53. The method of solution 51, wherein the format rule specifies that a third syntax element is conditionally included in the bitstream to indicate whether the CCPMPM is enabled at a level of the current video block.

54. The method of solution 53, wherein the third syntax element is included in the bitstream in case that the CCPMPM is enabled at the block level according to enablement at a picture level or a slice level or a tile level or a subpicture level or a brick level or a video unit level, wherein the video unit level corresponds to a coding tree unit or a coding tree unit row that includes the current video block.

55. The method of solution 53, wherein the third syntax element is indicated in case that a cross-component prediction mode is enabled for the current video block.

For example, the following solutions may be implemented according to the above-listed items in Section 4, e.g., item 21.

56. The method of any of solutions 1-55, wherein the format rule specifies that the CCPMPM is indicated in the bitstream as an additional mode of a cross-component linear model (CCLM) coding tool.

57. The method of solution 56, wherein the CCPMPM is signaled using a syntax element indicative of a mode of the CCLM.

58. The method of solution 56, wherein the format rule specifies that a flag indicating that the CCLM coding tool is enabled is set to a value 1 in response to enabling the CCPMPM for the current video block.

59. The method of any of solutions 57-58, wherein, for indicating the CCPMPM the syntax elements take a value larger than for indicating other modes of the CCLM.

For example, the following solutions may be implemented according to the above-listed items in Section 4, e.g., item 22.

60. The method of any of solutions 1-55, wherein the format rule specifies that the CCPMPM is indicated in the bitstream as a mode that is different from a cross-component linear model (CCLM) coding tool.

61. The method of solution 60, wherein the format rule specifies that the CCPMPM is enabled for the current video block in conditions when the CCLM coding tool is disabled for the current video block.

A third set of solutions is listed below.

For example, the following solutions may be implemented according to the above-listed items in Section 4, e.g., item 23.

Figure 23D:
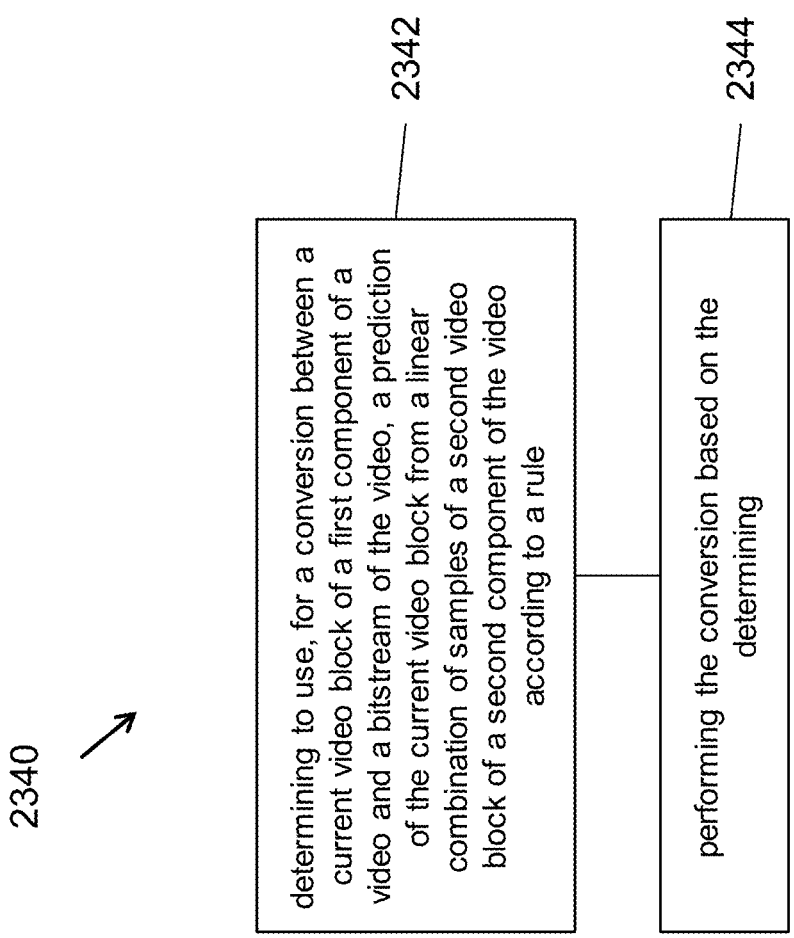

1. A method of video processing (e.g., method 2340 depicted in FIG. 23D), comprising determining (2342) to use, for a conversion between a current video block of a first component of a video and a bitstream of the video, a prediction of the current video block from a linear combination of samples of a second video block of a second component of the video according to a rule; and performing (2344) the conversion based on the determining; wherein the current video block and the second video block are coded using a local illumination compensation tool.

2. The method of solution 1, wherein the rule specifies that the first component is a chroma component and the second component is a luma component.

For example, the following solutions may be implemented according to the above-listed items in Section 4, e.g., item 24.

Figure 23E:
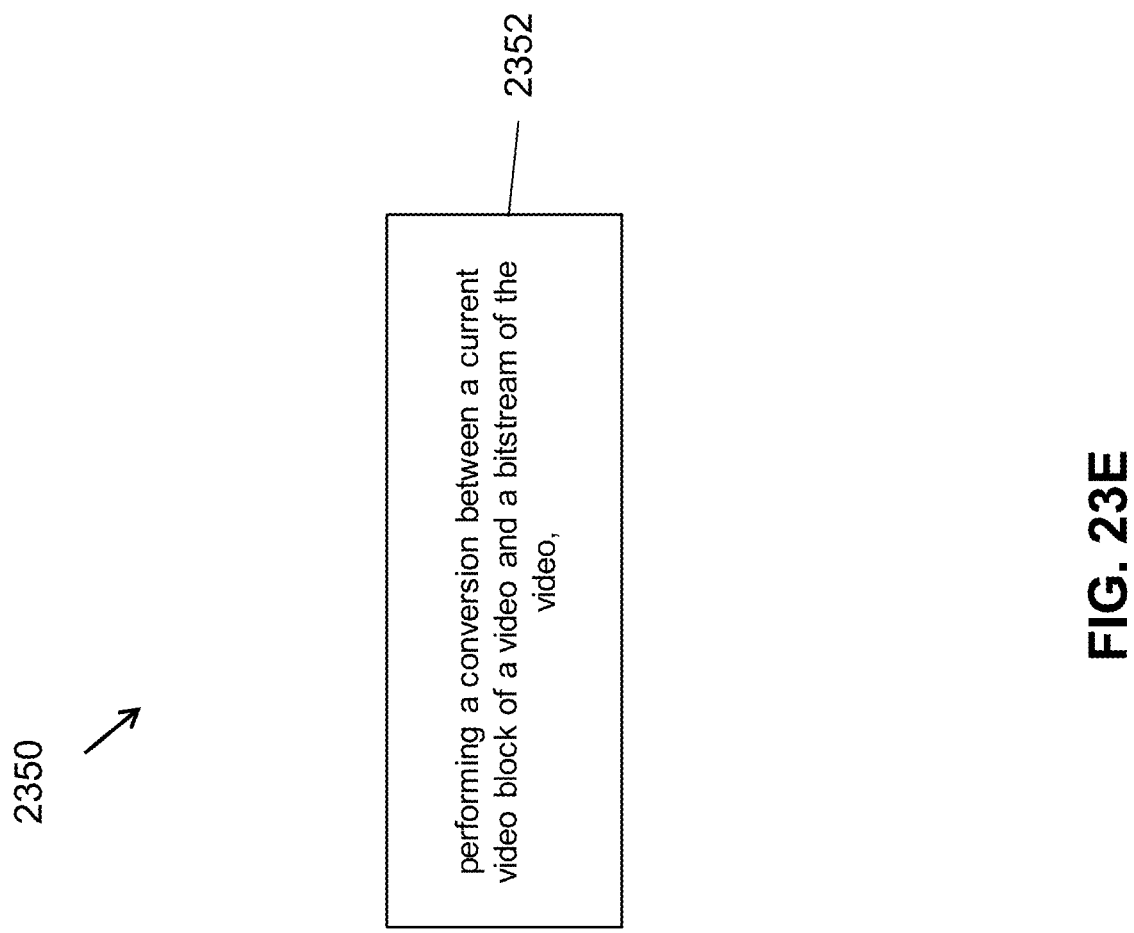

3. A method of video processing (e.g., method 2350 depicted in FIG. 23E), comprising performing (2352) a conversion between a current video block of a video and a bitstream of the video, wherein samples of the current video block are predictively coded using a multiple-parameter model (IPMPM) in which a linear combination of reference samples of the video using linear coefficients and/or an offset value; and wherein the bitstream conforms to a format rule.

4. The method of solution 3, wherein the format rule specifies that the reference samples are identified in the bitstream using motion vectors of the current video block.

5. The method of solution 3, wherein the format rule specifies that the reference samples are identified in the bitstream using a modification of motion vectors of the current video block.

6. The method of solution 5, wherein the modification of motion vector comprises an integer part of the motion vectors.

7. The method of any of solutions 3-6, wherein the linear coefficients and/or the offset value include a first set of linear coefficients and/or offset value in a first prediction direction and a second set of linear coefficients and/or offset value in a second prediction direction.

8. The method of solution 3, wherein the linear coefficients and/or the offset value include a first set of linear coefficients and/or offset value derived from a first motion vector of the current video block and a second set of linear coefficients and/or offset value is derived from a second motion vector of the current video block.

9. The method of solution 3, wherein the linear coefficients and/or the offset are derived from neighboring samples of a color component of the current video block.

10. The method of any of solutions 3-9, wherein the current video block is a non-luma video block.

For example, the following solutions may be implemented according to the above-listed items in Section 4, e.g., item 25.

11. The method of any of solutions 3-10, wherein the format rule specifies that the bitstream includes one or more syntax elements indicating whether the multi-parameter model is enabled for the current video block.

12. The method of solution 11, wherein the one or more syntax elements include a single syntax element.

13. The method of solution 12, wherein the single syntax element is included at a sequence level or a video level or a picture level or a slice level or a tile level or a subpicture level or a brick level or a video unit level, wherein the video unit is a coding tree unit or a coding tree unit level.

14. The method of solution 11, wherein the one or more syntax elements include a first syntax element at a sequence or a video level and conditionally a second syntax element at a finer level based on a value of the first syntax element, wherein the second syntax element is includes at a picture level or a slice level or a tile level or a subpicture level or a brick level or a video unit level, wherein the video unit is a coding tree unit or a coding tree unit level.

15. The method of solution 11, wherein the one or more syntax elements include a first syntax element, a second syntax element and a third syntax element, wherein the third syntax element is conditionally included at a video block level.

16. The method of solution 15, wherein the third syntax element is omitted in case that the first syntax element or the second syntax element indicate that use of the multi-parameter model is disabled for a picture or a slice or a tile or a subpicture or a brick le or a video unit that includes the current video block, wherein the video unit is a coding tree unit or a coding tree unit 17. The method of any of solutions 15-16, wherein the third syntax element is a single bit flag.

18. The method of any of solutions 15-17, wherein the format rule specifies that the third syntax element is conditionally included based on a coding mode of the current video block.

19. The method of solution 18, wherein the format rule specifies that the third syntax element is signaled in case that the coding mode is an Advanced Motion Vector Prediction (AMVP) mode.

20. The method of solutions 18-19, wherein the format rule specifies that the third syntax element is not signaled in case that the coding mode is a merge mode or a sub-block merge mode or an intra block copy mode or an affine mode or a palette coding mode or an intra mode.

21. The method of any of solutions 16-20, wherein the third syntax element is stored for use in coding of a next video block after the current video block.

22. The method of solution 16, wherein the format rule specifies that, in cases that the current video block uses a merge mode, a value of the third syntax element is inherited according to the merge mode.

23. The method of solution 22, wherein, in case that motion information of a spatially neighboring block is inherited, the value of the third syntax element is also inherited from the spatially neighboring block.

24. The method of solution 22, wherein, in case that motion information of a temporally neighboring block is inherited, the value of the third syntax element is also inherited from the temporally neighboring block.

25. The method of solution 16, wherein the format rule specifies that the third syntax element is stored in a history based motion vector prediction table for coding of a subsequent video block.

26. The method of solutions 16 or 25, wherein the format rule specifies that the third syntax element is inherited in case that corresponding motion vector information from a history based motion vector prediction table is also inherited.

Some embodiments may include the method of any of solutions in the sets above, wherein the conversion includes encoding the current video block into the bitstream.

Some embodiments may include the method of any of solutions in the sets above, wherein the conversion includes decoding the current video block from the bitstream.

Some embodiments may include a method of storing a bitstream representing a video to a computer-readable recording medium, comprising: generating a bitstream from a video according to a method recited in any one or more of above solution sets; and storing the bitstream to a computer-readable recording medium.

Some embodiments may include an apparatus for processing video data comprising a processor and a non-transitory memory with instructions thereon, wherein the instructions upon execution by the processor, cause the processor to implement a method recited in one or more of solution sets listed above.

Some embodiments may include a non-transitory computer-readable recording medium storing a bitstream of a video which is generated by a method performed by a video processing apparatus, wherein the method comprising: generating the bitstream from the current video block according to a method described in any one or more of above-listed solution sets.

Some embodiments may include a computer readable medium that stores the bitstream generated according to any one or more of above-listed solution sets.

Some embodiments may include a method, an apparatus, a bitstream according to a format rule or a system described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
performing a conversion between a current video block of a second color component of a video and a bitstream of the video using a cross-component prediction with multiple-parameter model (CCPMPM) in which samples of the current video block are predictively coded in the bitstream using a linear combination of samples of a first color component multiplied by linear coefficients and/or one or more offsets;
wherein the bitstream conforms to a format rule; and
wherein the linear coefficients of the CCPMPM are determined using a first rule; and
wherein the samples of the first color component are determined using a second rule.

2. The method of claim 1, wherein the samples of the first color component include multiple groups of samples of the first color component, wherein one of the linear coefficients is applied to each sample in a group of the first color component.

3. The method of claim 2, wherein the one or more offsets include offsets applied to the linear combination of each group of samples of the first color components.

4. The method of claim 1, wherein each of the multiple groups of samples of the first color component are defined by a filter shape and a center sample of the group.

5. The method of claim 4, wherein the center samples depend on a color format of the video and/or a position of a sample of the second color component that is predicted, wherein the color format is 4:4:4, 4:2:2 or 4:2:0.

6. The method of claim 5, wherein, in case that the sample of the second color component is located as (x, y), then the center sample is at a position (x, y) in the first color component in case of 4:4:4 format, where x and y represent fractional or integer sample position numbers.

7. The method of claim 5, wherein, in case that the sample of the second color component is located as (x, y), then the center sample is at a position (2*x, y) in the first color component in case of 4:2:2 format, where x and y represent fractional or integer sample position numbers.

8. The method of claim 5, wherein, in case that the sample of the second color component is located as (x, y), then the center sample is at a position (2*x, 2*y) in the first color component in case of 4:2:0 format, where x and y represent fractional or integer sample position numbers.

9. The method of claim 4, wherein the filter shape is one of an N1-point rectangle or an N3 point a square, an N2-point diamond, an N4-point hexagon or an N5-point octagon, wherein N1, N2, N3, N4 and N5 are positive integers.

10. The method of claim 9, wherein the filter shape for the current video block is dependent on an intra prediction mode used for coding the current video block.

11. The method of claim 1, wherein the second rule specifies use of multiple filter shapes for determining the samples of the first color component.

12. The method of claim 11, wherein the format rule specifies that the multiple filter shapes are indicated in the bitstream at a sequence level or a video level or a picture level or a slice level or a tile level or a subpicture level or a brick level or a video unit level, wherein the video unit is a coding tree unit or a coding tree unit level, in a picture header or a slice header.

13. The method of claim 11, wherein the format rule specifies that the multiple filter shapes are indicated in a sequence parameter set or a picture parameter set.

14. The method of claim 1, wherein the first rule specifies that the linear coefficients of the CCPMPM are determined using a first set of neighboring samples according to a first filter shape and a second set of neighboring samples according to a second filter shape, wherein the first set and the second set include at least some different samples.

15. The method of claim 1, wherein the conversion includes encoding the current video block into the bitstream.

16. The method of claim 1, wherein the conversion includes decoding the current video block from the bitstream.

17. An apparatus for processing video data comprising a processor and a non-transitory memory with instructions thereon, wherein the instructions upon execution by the processor, cause the processor to:
perform a conversion between a current video block of a second color component of a video and a bitstream of the video using a cross-component prediction with multiple-parameter model (CCPMPM) in which samples of the current video block are predictively coded in the bitstream using a linear combination of samples of a first color component multiplied by linear coefficients and/or one or more offsets;
wherein the bitstream conforms to a format rule; and
wherein the linear coefficients of the CCPMPM are determined using a first rule; and wherein the samples of the first color component are determined using a second rule.

18. The apparatus of claim 17, wherein the samples of the first color component include multiple groups of samples of the first color component, wherein one of the linear coefficients is applied to each sample in a group of the first color component.

19. The apparatus of claim 18, wherein the one or more offsets include offsets applied to the linear combination of each group of samples of the first color components.

20. A non-transitory computer-readable recording medium storing a bitstream of a video which is generated by a method performed by a video processing apparatus, wherein the method comprises:
  generating the bitstream of a current video block of a second color component of the video using a cross-component prediction with multiple-parameter model (CCPMPM) in which samples of the current video block are predictively coded in the bitstream using a linear combination of samples of a first color component multiplied by linear coefficients and/or one or more offsets;
  wherein the bitstream conforms to a format rule; and
  wherein the linear coefficients of the CCPMPM are determined using a first rule; and
  wherein the samples of the first color component are determined using a second rule.

* * * * *